United States Patent [19]
Gill et al.

[11] Patent Number: 6,069,729
[45] Date of Patent: May 30, 2000

[54] HIGH SPEED ELECTRO-OPTIC MODULATOR

[75] Inventors: Douglas M. Gill, Evanston; Seng-Tiong Ho, Wilmette, both of Ill.

[73] Assignee: Northwestern University, Evanston, Ill.

[21] Appl. No.: 09/233,338

[22] Filed: Jan. 20, 1999

[51] Int. Cl.⁷ .................................................. G02F 1/07
[52] U.S. Cl. .................. 359/245; 385/2; 385/3; 385/9; 430/321
[58] Field of Search ........................ 359/245, 246, 359/254; 385/2, 3, 8, 9, 14, 40; 430/321

[56] References Cited

U.S. PATENT DOCUMENTS

| | | | |
|---|---|---|---|
| 4,984,861 | 1/1991 | Suchoski, Jr. et al. | 385/2 |
| 5,347,608 | 9/1994 | Nakamura et al. | 385/2 |
| 5,416,859 | 5/1995 | Burns et al. | 385/3 |
| 5,455,876 | 10/1995 | Hopfer et al. | 385/2 |
| 5,712,933 | 1/1998 | Nishimoto et al. | 385/9 |
| 5,748,358 | 5/1998 | Sugamata et al. | 359/245 |
| 5,790,719 | 8/1998 | Mitomi et al. | 385/2 |
| 5,895,742 | 4/1999 | Lin | 430/321 |

OTHER PUBLICATIONS

Design of Ultra–Broad–Band LiNbO₃ Optical Modulators with Ridge Structure; Mitomi, Noguchi and Miyazawa, 1995 IEEE.

*Primary Examiner*—Loha Ben
*Attorney, Agent, or Firm*—Stroock & Stroock & Lavan LLP

[57] ABSTRACT

High speed electro-optic modulator designs are presented. One design includes first and second electrodes offset from each other and further includes a substrate supporting a laterally confined ferroelectric material, for example, LiNbO₃. The confined ferroelectric material, in turn, supports first and second optical waveguides. In a second design, a thin ferroelectric film is fabricated on a substrate that supports first and second electrodes. The thin ferroelectric film has a first thickness in which the first and second optical waveguides are supported, and a second thickness under a portion of the electrodes. The second thickness, for example, may be zero. A third design includes a thin ferroelectirc film fabricated on a substrate and supporting first and second electrodes. The thin ferroelectric film has a reduced thickness in at least one electrode gap region.

47 Claims, 20 Drawing Sheets

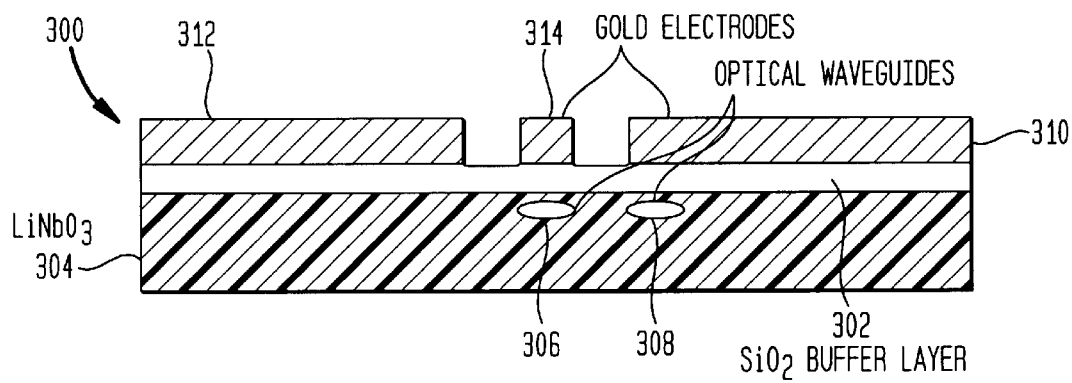
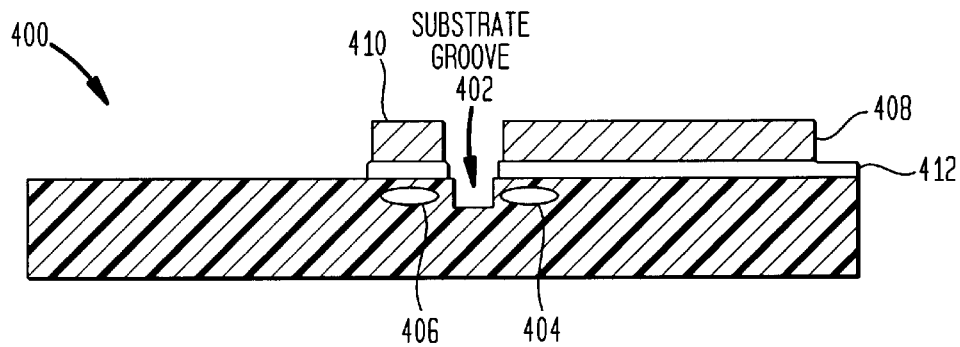
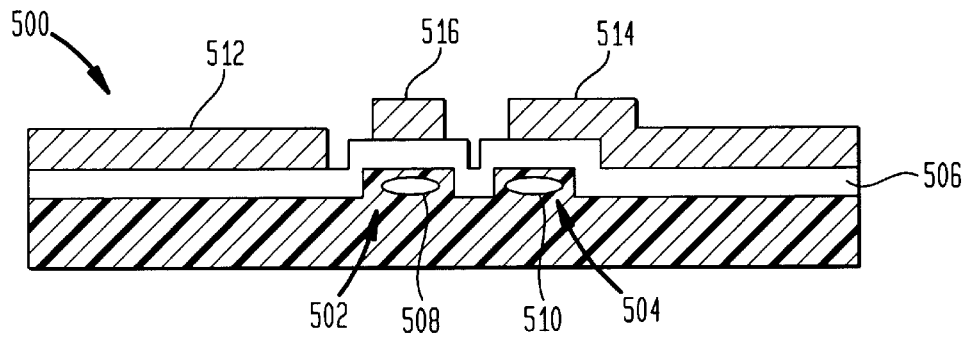
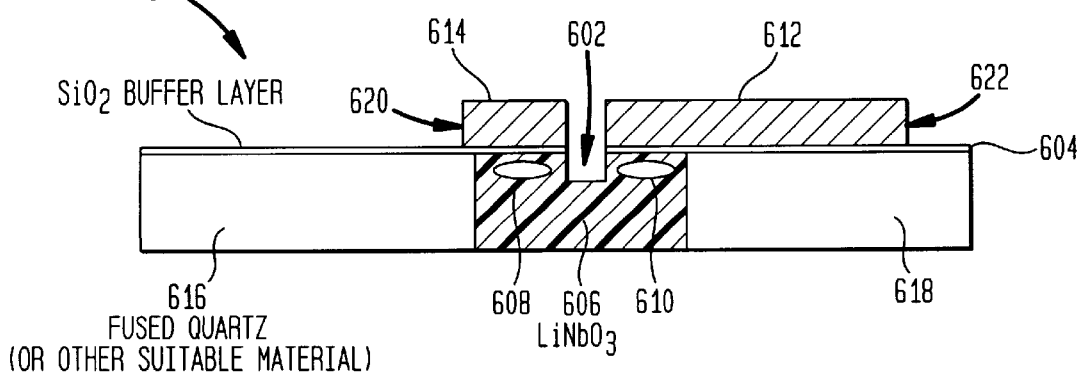

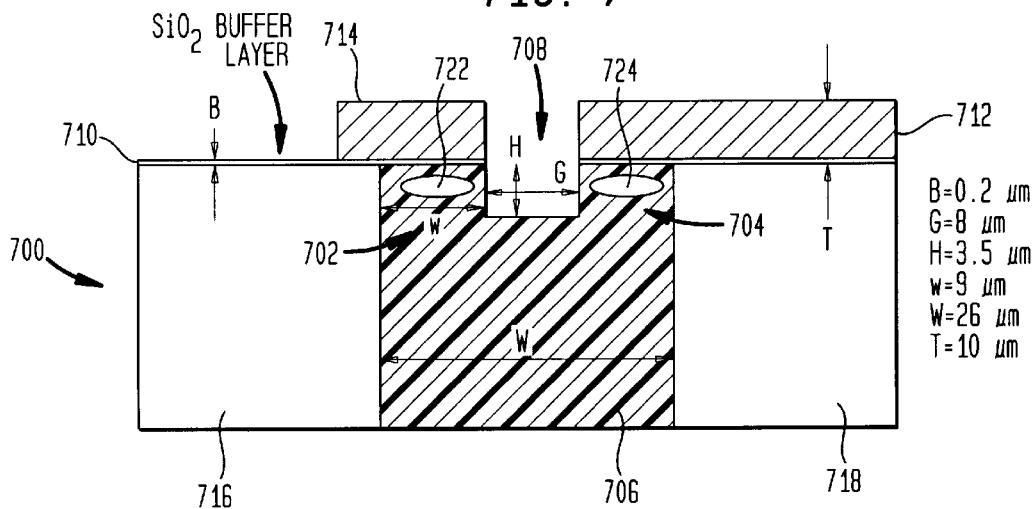
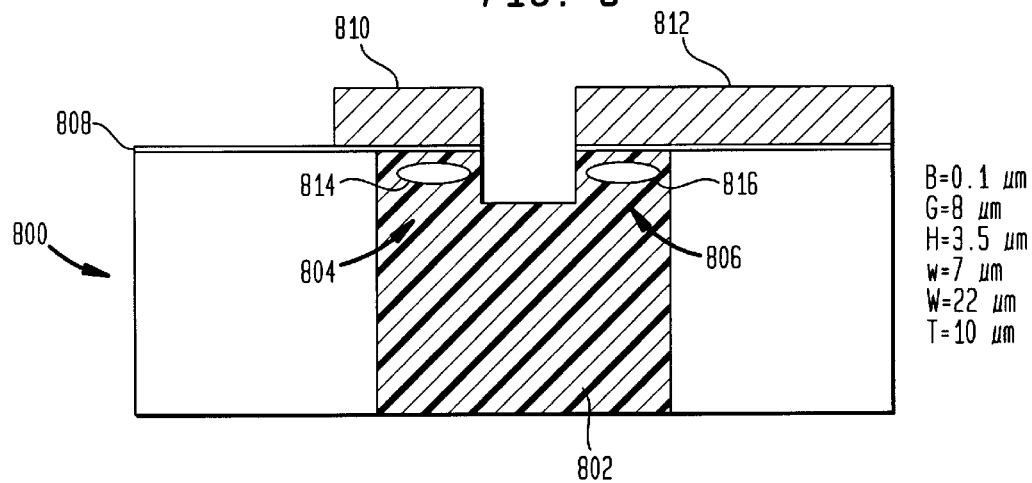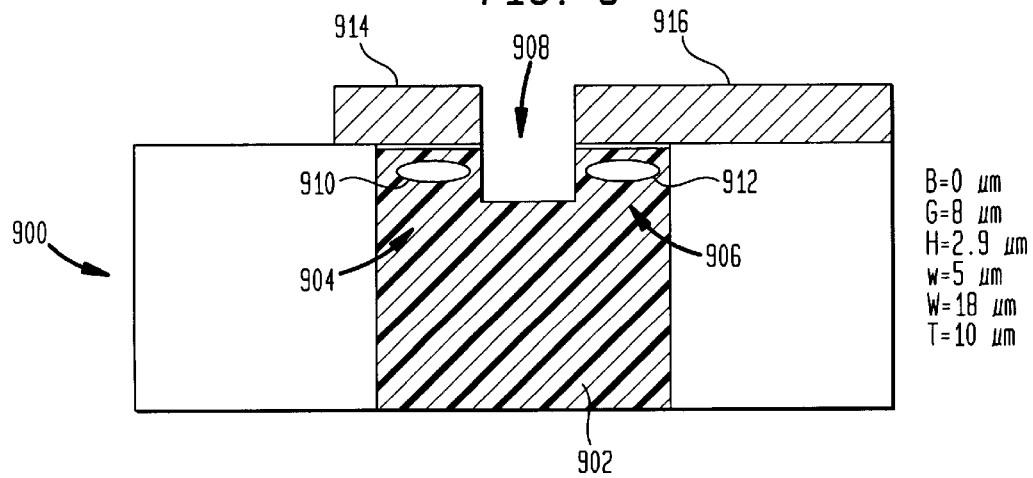

FILM THICKNESS
~3.5 μm

ETCH DEPTH
=0 μm

FILM THICKNESS
~2.7 μm

ETCH DEPTH
=0.7 μm

FILM THICKNESS
~2.4 μm

ETCH DEPTH
=2.4 μm

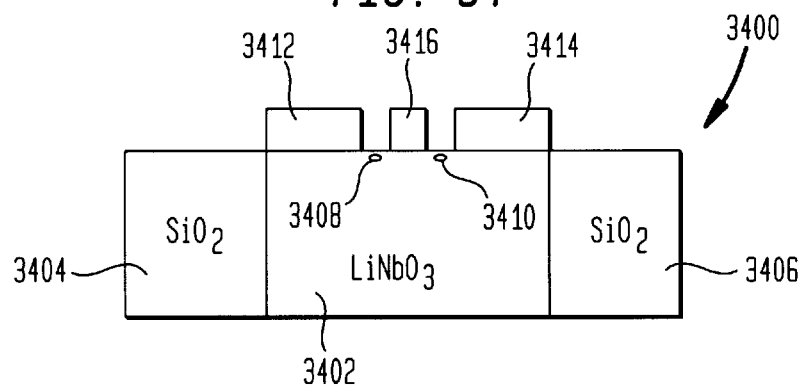
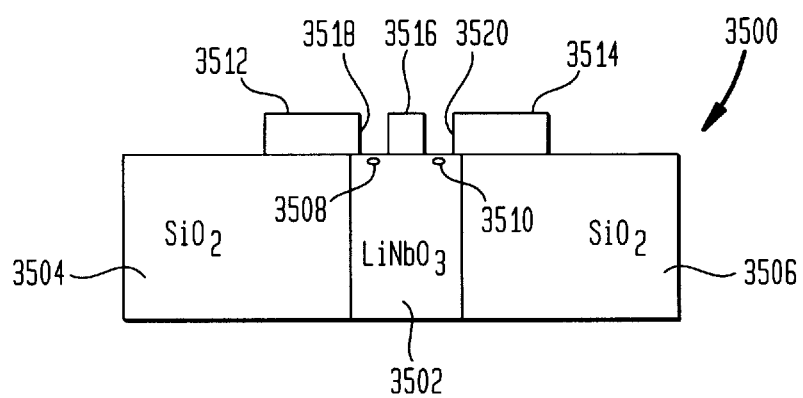
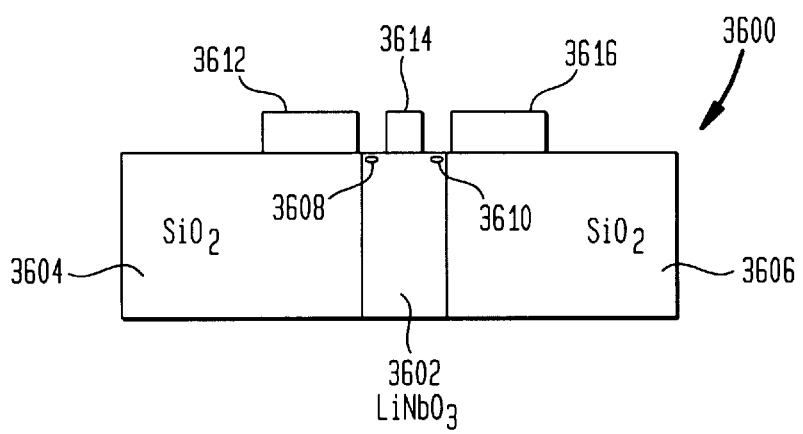
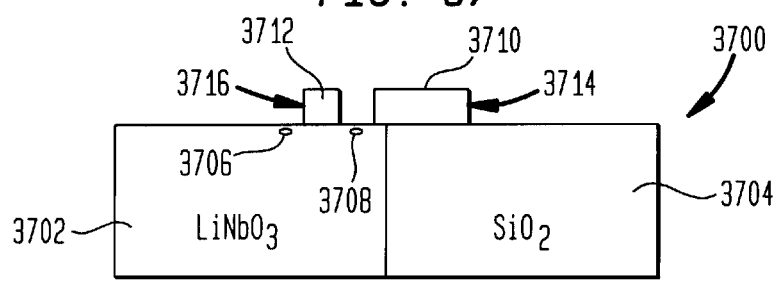

HIGH SPEED ELECTRO-OPTIC MODULATOR

STATEMENT REGARDING FEDERALLY SPONSORED RESEARCH OR DEVELOPMENT

The present invention was developed under grant DMR-7632472 provided by the National Science Foundation. The Government has certain rights in this invention.

TECHNICAL FIELD

The present invention is directed to an electro-optic modulator; and more particularly to an electro-optic modulator using a laterally confined $LiNbO_3$ structure that reduces the need for buffer layers between modulator electrodes and optical waveguides.

CROSS-REFERENCE TO RELATED APPLICATIONS

Not Applicable

BACKGROUND OF THE INVENTION

Commercially available fiber optic data transfer systems have, in recent years, significantly increased the speed at which information can be transferred from point to point. Electro-optic (EO) light modulators, that operate at a wavelength $\lambda$ of approximately 1.5 $\mu$m with bandwidths of 2.5 and 10 GHz, are vital to these data transfer systems. The resulting 10 Gbit/sec data transfer rate is a well entrenched (although recently entrenched) technological standard in present-day communications systems. Communication industries have already identified 40 Gbit/sec as the next-generation target for data transfer systems. The industry's hope is to operate these modulators with drive voltages of approximately 2 to 5 V. Device insertion loss must also be less than approximately 6 dB. The target date for these new standards is early in the 21st century, however, industrial research efforts are presently under way to study potential technologies to achieve these goals.

Commercially available EO modulators are currently based on integrated optic waveguide elements fabricated in bulk $LiNbO_3$ crystals. The maturity and proven long-term stability of commercial $LiNbO_3$ modulators has established this technology without competition in optical communications markets (for example, cable TV and telecommunications). However, existing fiber optic networks are capable of operating at much higher bandwidths than provided by the available $LiNbO_3$ modulators. A current limiting aspect of data transfer rates in fiber optic-based communications is the operation bandwidth of the commercially available $LiNbO_3$ electro-optic modulators.

It has been shown that the bandwidth of $LiNbO_3$ EO modulators can be significantly improved by using a composite substrate for the device host. The key to bandwidth improvement is a reduction in the effective dielectric constant of the composite substrate over that of bulk substrates. Most demonstrated composite substrate devices have been realized in the form of bulk grown $LiNbO_3$ coated with a lower dielectric buffer layer. A second proposed composite substrate is that of a thin film ferroelectric on top of a low dielectric substrate. The major obstacle to the practical application of thin film ferroelectrics has been the difficulty encountered in fabricating high quality films.

Current commercial electro-optic modulators are based on devices fabricated in bulk-grown $LiNbO_3$ crystals. Many research groups are focussing on thin film ferroelectric materials grown by a number of techniques (e.g., metal-organic chemical vapor deposition, molecular beam epitaxy, pulsed laser deposition, and sputtering). However, these growth techniques are new to the application of thin film ferroelectric growth. Thus, a need exists in the industry for a manufacturable modulator capable of meeting the needs of the next generation of communications systems.

BRIEF SUMMARY OF THE INVENTION

One aspect of the present EO modulator design is the lateral confinement of $LiNbO_3$ (or other appropriate material), that significantly reduces the effective dielectric constant of the substrate. This makes it possible to achieve a velocity matching condition with a reduced thickness low-dielectric buffer layer between the modulator electrodes and optical waveguides. The thinner buffer layer increases the overlap between the modulating RF and modulated optical fields. The larger RF/optical overlap reduces the required drive voltage and increases the attainable bandwidth of the modulator design.

One further aspect of the present design is the use of a grooving technique in conjunction with the lateral confinement of the $LiNbO_3$ (or other ferroelectric material) that allows the realization of a velocity matched modulator design with a very thin, or even no, buffer layer. This further reduces the required device drive power and increases device bandwidth.

Another characteristic of the present design is the lateral confinement of $LiNbO_3$ in an electro-optic modulator in which the $LiNbO_3$ is, for example, 20 to 500 $\mu$m thick. Such dimensions may be achieved through cutting and mechanically thinning (e.g., by polishing) bulk grown crystals. Thus, yet another aspect of the present design is the use of bulk grown $LiNbO_3$ to fabricate the new design and to take advantage of the proven long-term reliability of bulk grown $LiNbO_3$ in commercial devices. The present design offers enhanced performance and may be realized with proven materials using established manufacturing techniques.

Another aspect of the present invention is the lateral confinement and thinning of the $LiNbO_3$ in a modulator design that reduces RF leaking. By thinning the $LiNbO_3$ to a thickness that will not support the relevant RF substrate propagation modes the present design avoids unwanted dissipation of RF energy. Furthermore, another aspect of the present design is the use of a low dielectric material (for example, quartz) as the complimentary composite-substrate constituent and the laterally confining material. Thus, RF leaking may be suppressed while still allowing the modulator to be fabricated in a substrate thick enough for convenient processing.

Yet another aspect of the present design is the fabrication and lateral confinement of the $LiNbO_3$ that minimizes the overlap of the RF field with regions of the $LiNbO_3$ crystal that do not contribute to the modulation of light in order to reduce excess RF dielectric losses.

A further aspect of the present design is the use of asymmetric coplanar strip waveguide electrodes (ACPS) made available by the reduction in RF leaking from the lateral confinement of the $LiNbO_3$ in the modulator design. The use of ACPS electrodes allows a reduction in the electrode gap while still maintaining the modulator velocity and impedance matching conditions. The reduction in electrode gap provides a higher field from the same driving voltage and thus the required drive power for the modulator is reduced.

These and other advantages and novel features of the present invention, as well as details of an illustrated embodiment thereof, will be more fully understood from the following description and drawings.

BRIEF DESCRIPTION OF THE SEVERAL VIEWS OF THE DRAWING

FIG. 3 shows one example of a prior EO modulator design.

FIG. 4 shows another example of a prior EO modulator design.

FIG. 5 depicts a third example of a prior EO modulator design.

FIG. 6 illustrates an EO modulator design according to the present invention.

FIG. 7 shows one particular example set of dimensions for an EO modulator according to the present invention.

FIG. 8 shows a second particular example set of dimensions for an EO modulator according to the present invention.

FIG. 9 shows a third particular example set of dimensions for an EO modulator according to the present invention.

FIG. 34 shows an X-cut electro-optic modulator design in which the ferroelectric crystal is confined to a degree providing little enhancement in device performance.

FIG. 35 depicts an X-cut electro-optic modulator design in which the ferroelectric crystal is confined to a degree providing increased performance over the device shown in FIG. 35.

FIG. 36 illustrates an X-cut electro-optic modulator design in which the ferroelectric crystal is confined to a degree reducing device performance.

FIG. 37 shows an X-cut electro-optic modulator design in which a single waveguide experiences a phase shift and the ferroelectric crystal is confined to a degree providing increased performance.

DETAILED DESCRIPTION OF THE INVENTION

Figure 1:
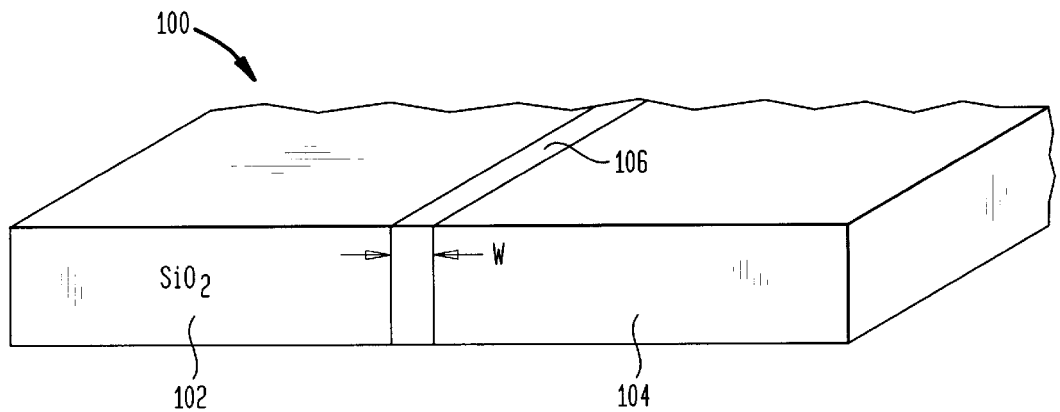
FIG. 1 illustrates one example of film dimensions for a vertically oriented (laterally confined) ferroelectric film.

The present design introduces a new composite substrate geometry t hat laterally confines an electro-optic material (e.g., a ferroelectric material) on either side with, preferably, a low dielectric constant, low dielectric loss confining material. The confining material is bonded to the ferroelectric material that supports the waveguide structures (created with diffused Titanium or proton exchange) in the electro-optic (EO) modulator. The confining material generally supports the structures, such as electrodes, that are fabricated above the confining material. However, the confining material may be eliminated in designs that have no structures that would require support from the confining material.

A electro-optic material or film, in general, is one that changes its index of refraction in the presence of an electric field to provide a variable optical path length. As examples, the electro-optic material may be a ferroelectric including $LiNbO_3$, $BaTiO_3$, or $LiTaO_3$. The confining material may, for example, be fused quartz, $SiO_2$, non-Alkali glass, or White Crown glass (which provides the further advantage of having thermal expansion properties closer to those of $LiNbO_3$), although other low dielectric constant confining materials with low dielectric losses are also suitable.

The present design provides significant improvement in EO device performance. Presented below are the physical sources of performance limitations in $LiNbO_3$ EO modulators, the optimization strategy of the present design, the design itself, and device modeling that compares the present design to previously demonstrated devices.

There are three physical characteristics that are prevalent in limiting bandwidth in $LiNbO_3$ EO modulators: the difference between the propagation speeds of the modulating RF and modulated optical radiation, the RF propagation losses, and the overlap between the RF field and the optical waveguides.

The difference between the RF and optical propagation speeds is often referred to as the modulator "walk-off." The propagation speeds will be referred to by the propagation constants of the modulating RF voltage and the modulated optical signal, $n_{RF}$ and $n_{opt}$, respectively. The optical propagation constant, $n_{opt}$, is dependent on the optical waveguide host material will be considered as a constant. For $LiNbO_3$ the optical propagation constants are $n^o_{opt}$ approximately 2.2115 and $n^e_{opt}$ approximately 2.1385 for $\lambda$ approximately 1.5 $\mu$m light. In general, one aspect of the present design is matching the RF propagation constant to $n^e_{opt}$ approximately 2.1385. The RF propagation constant, $n_{RF}$, is determined by transmission line considerations, such that $n_{RF} = (C/C_o)^{1/2}$ where C=the modulator line capacitance and $C_o$=the line capacitance of the electrodes after removal of the substrate (i.e. as if the electrodes were floating in air). For typical $LiNbO_3$ EO modulators $n_{RF} > n_{opt}$, (in fact, $n_{RF}$ is approximately $2(n_{opt})$). Therefore, by reducing the ratio $C/C_o$ the operation bandwidth may be increased. However, it is noted that maximum bandwidth may be attained when $n_{RF} = n_{opt}$, hereafter referred to as velocity matching. If the device capacitance is reduced too much, walk-off will increase and modulator bandwidth will be reduced.

RF propagation losses have been the focus of a large amount of research effort largely because of the general technological importance of microwave strip lines. RF propagation losses in $LiNbO_3$ based electro-optic modulators are caused by three phenomena, conductor losses, dielectric losses, and RF coupling into radiative substrate modes. Each of these loss mechanisms will be briefly discussed.

Conductor loss refer s too the series skin resistance of the modulator electrodes, typically gold. The high frequency (>1 GHz) RF conductor losses are frequency dependent and proportional to the square root of the RF frequency, such that, $$\alpha_C \text{ is approximately } \alpha_o \cdot (f)^{1/2},$$

where $\alpha_C$ is the conductor loss, $\alpha_o$ is the conductor loss factor (a constant dependent on electrode material and geometry), and f is the modulating RF frequency. As a consequence the average voltage seen in the modulator interaction region is reduced as the frequency is increased. This sets a fundamental limit on the frequency at which $LiNbO_3$ modulators can be operated with a given RF power.

Dielectric losses vary from material to material and tend to become more important at frequencies greater than 10 GHz. How ever, in previously demonstrated modulators, conductor loss has been found to dominate the RF propagation loss at frequencies under 40 GHz. The energy loss per second is given by, $$W = 2\pi f \epsilon_{eff}'(V_o^2/2) \tan \delta,$$

where $V_o$ represents the maximum RF voltage, $\epsilon_{eff}'$ is the effective RF dielectric constant, and $\delta$ is the loss angle of the material. Therefore, the power loss is proportional to the product of the frequency, f, and the loss tangent, $\tan \delta$, for a given material. The dielectric loss in a composite substrate is the sum of the loss from each substrate component. The dielectric loss from each substrate component is dependent on its loss angle and overlap with the RF energy. The loss tangent of $LiNbO_3$ is on the order of $\tan(\delta_{33}^{LiNbO3})$ (approximately 0.01) where the loss tangent of fused silica is on the order of $\tan(\delta_{SiO2})$ (approximately 0.0005.) The coupling of RF energy into radiative substrate modes, hereafter referred to as RF leaking, is a topic that has also received considerable attention. At higher frequencies of operation (>5 GHz) the fundamental RF propagating mode can become leaky by coupling some of its energy into substrate propagation modes. In addition, it has been shown that, given the proper geometric circumstances, reflections of the substrate mode can occur which result in resonance in the RF transmission at specific frequencies. Since RF leaking is worse in both higher dielectric constant and thicker substrates, the use of low dielectric constant materials, and the thinning of the ferroelectric, in composite substrates can significantly reduce RF leaking.

Optimizing the electric field overlap with the optical waveguide, hereafter referred to as EO overlap, enhances the bandwidth limit of a velocity-matched modulator. The EO overlap refers to the average electric field present, at the center of the waveguide, near the surface of the ferroelectric crystal. Increasing the EO overlap in modulator structures, which are nearly velocity matched (i.e. minimal walk-off), is one source of bandwidth improvement in the present laterally confined modulator design, and will be discussed at length below.

The two major considerations used in determining the performance of modulator designs are the bandwidth limitations due to modulator walk-off (WO BWL), and the electrode RF conductor losses (RF BWL). The impact that these loss mechanisms may have on the performance of the present design is addressed below.

The operation bandwidth limit of $LiNbO_3$ based electro-optic modulators is typically due to one of two causes, the WO BWL and/or the RF BWL. By designing a modulator in which the WO BWL is approximately equal to RF BWL, maximum bandwidth may typically be achieved. In addition, increasing the EO overlap allows a more efficient use of available RF power because the same amount of modulation can be achieved with a shorter electrode length. Therefore, the conductor loss is reduced, and the RF power is more efficiently used.

The dielectric loss is a function of the substrate geometry, since each material within a composite substrate will produce different dielectric losses. The dielectric losses from the modulator optical waveguides may be looked at as a necessary consequence of modulating the light. Any other dielectric losses dissipate RF power without contributing to light modulation. The lateral confinement of the $LiNbO_3$ in the present design as described in more detail below, helps to reduce dielectric losses while maximizing the EO overlap.

The present modulator design, as described in more detail below, produces a structure in which the EO overlap is greatly increased, the RF losses are greatly reduced, and the RF BWL is approximately equal to WO BWL.

The present electro-optic modulator design has performance characteristics allowing it to achieve 40 Gbit/sec data transfer rates. One aspect of the present design is that it may be built from materials that are presently commercially available in the communications industry using established fabrication processes. The present invention, as described in more detail below, presents fundamental geometric modifications that greatly enhance device performance.

Figure 2:
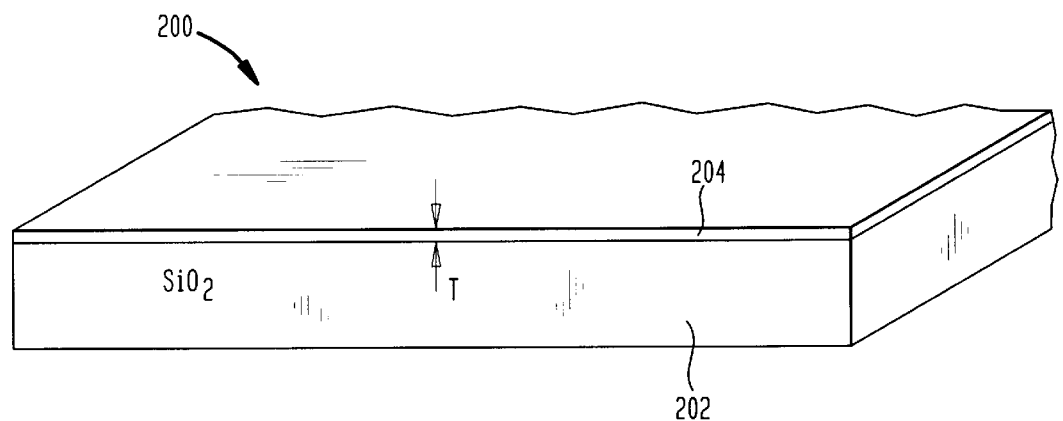
FIG. 2 shows an example of film dimensions for a laterally oriented thin film.

With reference to FIG. 1, an illustration is provided of a composite substrate 100 including confining material 102, 104 (e.g., $SiO_2$ or quartz) and a ferroelectric material 106 (e.g., $LiNbO_3$). The roles of the confining material 102, 104 and the material 106 are further discussed below. Note that the material 106 is oriented perpendicularly rather than parallel as in previously proposed designs. FIG. 2 shows a prior design 200 using a full $SiO_2$ substrate 202 and (parallel oriented, but not laterally confined) film 204 of approximately 1–4 µm thick ('T').

An EO modulator (as further defined below) including the substrate 100 may operate at 40 GHz with <24 dBm of RF power (<5 $V_{p-p}$) with a half wave voltage approximately 40% lower than that of any previously proposed velocity-matched structure. In addition, the use of the composite substrate 100 allows for an improved ability to manage RF propagation loss mechanisms, such as substrate dielectric losses and RF coupling into substrate propagation modes. Therefore, more efficient use of the available RF power may be achieved.

By placing the ferroelectric material 106 vertically in the structure (and laterally confining the material 106), the ferroelectric material 106 dimension ('W') can be relatively large (approximately 20–500 µm thick, as opposed to only 1–4 µm thick in the substrate 200). This allows the material 106 to be fabricated from bulk-grown materials. By laterally confining the ferroelectric material 106, the modulator capacitance may be significantly reduced and RF/optical velocity matching may be achieved with the minimal use of buffer layers between the modulator electrodes and optical waveguides. The minimal use of a buffer layer significantly improves the overlap between the modulating RF field and the modulated optical signal. The increase in RF/optical overlap also decreases the required RF drive power and increases the potential bandwidth of operation.

The modeling of each modulator design below assumes an interferometric design in which the input waveguide splits, through a waveguide coupling region (e.g., a 3 dB Y-splitter), in to two separate waveguides, then joins, in another waveguide coupling region (e.g., a reverse Y-split) into a single output waveguide. This may be clearly seen in FIG. 14, with reference to the modulator 1400.

In general, an input optical signal is applied to the modulator 1400 on the input waveguide 1414. The input optical signal is split in the Y-splitter waveguide coupling region 1416, in which it travels along two optical waveguides 1408, 1410 of equal physical length (typically formed from diffused Titanium or proton exchange in the ferroelectric material 1402). The ferroelectric material 1402 has the property that its index of refraction changes in the presence of an electric field. Thus, the optical waveguide located under the signal electrode changes its effective optical path length in response to the RF signal on the electrode even though its physical length remains the same. The optical signal in this waveguide thus experiences a phase shift with respect to the other optical signal, such that when the two are rejoined at the combining Y-junction waveguide coupling region 1418, the signals either add in phase and form a first order optical propagation mode or add out of phase and form a second order optical propagation mode. If the signals form a second order optical propagation mode, the light cannot be supported by the device waveguide and thus the light radiates out of the waveguide and no light is produced on the output waveguide 1420. The RF signal has thus modulated the optical carrier and is provided on the output waveguide 1420.

FIG. 3 shows a modulator 300 based on a design proposed and fabricated by Gopalakrishnan et al. This structure attempts to achieve velocity matching by use of a thick buffer layer 302 on a substrate 304. The typical positions of the optical waveguides 306, 308, ground electrodes 310, 312, and signal electrode 314 are shown. The buffer layer 302 facilitates velocity matching by reducing device capacitance, however, this also seriously reduces the EO overlap and reduces the modulator RF BWL.

FIG. 4 shows a second design 400 which incorporates a groove 402 between the two waveguides 404, 406 of the interferometric modulator. This reduces device capacitance and RF dielectric losses by reducing the electric field overlap with regions of the crystal that do not contribute to the modulation of light. However, this technique and this design cannot achieve velocity matching without the use of a thick buffer layer. Again, in FIG. 4, the optical waveguides 404, 406, ground electrode 408, signal electrode 410, and buffer layer 412 are shown. FIG. 4 is representative of a modulator demonstrated by Haga, et al.

FIG. 5 shows a modulator design 500, proposed and fabricated by Noguchi et al., that goes one step further than the design in FIG. 4 by using a ridged waveguide design. The use of waveguide ridges (generally indicated as 502, 504) alone can not produce a velocity-matched device without disadvantageously including a thick buffer layer. FIG. 5 shows the optical waveguides 508, 510, ground electrodes 512, 514, signal electrode 516, and the buffer layer 506.

Turning now to FIG. 6, one example of an EO modulator 600 according to the present invention is shown. The modulator 600 may incorporate a groove 602 and use a very thin buffer layer 604 (which may be eliminated in certain embodiments as explained below). Note that the ferroelectric material 606 is laterally confined in extent and includes the waveguides 608, 610. In this way velocity matching may be achieved, even without a buffer layer 604.

FIG. 6 shows the locations of the optical waveguides 608, 610, ground electrode 612 located substantially over the optical waveguide 610, RF signal electrode 614 offset from the ground electrode 612 and located substantially over the optical waveguide 608, and lateral confinement material 616, 618 (which may be fused quartz, for example) for the ferroelectric material 606. In general, the ferroelectric material 606 is confined on the left from extending beyond the furthest extent of the electrode 614 to the left (edge 620). Additionally, or alternatively, the ferroelectric material 606 is confined on the right from extending beyond the furthest extent of the electrode 612 to the right (edge 622).

One effect of reducing, or eliminating, the buffer layer 604 is that the EO overlap of the RF signal and optical carrier is greatly increased. Increasing the EO overlap while maintaining near-velocity matching is one aspect contributing to the performance improvement realized from the present modulator design.

FIGS. 3–6 show that the modulator designs use both asymmetric coplanar strip (ACPS) electrodes (FIGS. 4 and 6), and symmetric coplanar waveguide (SCPW) electrodes (FIGS. 3 and 5). The use of SCPW electrodes (so named due to the ground electrodes provided on both sides of the signal electrode) helps to prevent RF leaking. It has been shown that in the absence of RF leaking, ACPS electrodes (which include a single ground electrode for the signal electrode) have lower propagation losses than SCPW electrodes. However, RF leaking can seriously degrade device performance.

RF leaking is typically minimized in two ways: coating the substrate with a conductor (as in the SCPW electrode geometry), and thinning the substrate (so that the RF substrate modes cannot be supported). Laterally confining the ferroelectric material 606, as in the present design 600, provides suppression of RF substrate propagation modes since the ferroelectric material 606 may be thinner than in typical device designs, and the RF propagation modes are not supported in the confining material 616, 618 due to its lower dielectric constant. Therefore, the problem of RF leaking may be greatly reduced, and ACPS electrodes may be used in the present modulator designs.

The comparison of modulator performance is based on calculating each structure's low frequency half wave voltage, $V_\pi(LF)$, and maximum frequency at which full modulation can be achieved with an applied 5 $V_{p-p}$ RF potential. The maximum frequency of full modulation with an applied 5 $V_{p-p}$ RF potential is called the total bandwidth limit (TBL) and is determined by calculating the WO BWL and the RF BWL for each design. The WO BWL is calculated assuming an interferometric modulator design. WO BWL is kept somewhat larger than the RF BWL in order to accurately compare the present design to previously reported designs (since the RF BWL<WO BWL in most of the listed devices used for comparison). The RF BWL is determined by calculating the EO overlap and the frequency dependent RF conductor losses. The expected dielectric losses may also be taken into account, however, it has been shown that conductor losses dominate the RF propagation losses for frequencies up to, and in excess of, 40 GHz.

A comparison of the modeled performance of each modulator 300, 400, 500, 600 is shown in Table 1. The structures used for comparison were demonstrated with operation wavelengths of 633 nm (the Haga modulator 400), 1300 nm (the Gopalakrrishnan modulator 300) and 1550 nm (the Noguchi modulator 500). The modeled characteristics listed in Table 1 represent operation at λ=1500 nm. The listed total bandwidth limit (TBL) is, in general, the RF BWL since the RF BWL<WO BWL in most of the listed devices. The highest TBL and the lowest half wave voltage, of the previously reported designs, is that of Gopalakrishnan et al., $V_\pi(LF)$=4.2 V and TBL=9 GHz (for 1.5 μm light with a 5 $V_{p-p}$ applied R.F potential). The modeled response of the present modulator 600, labeled Gill, shows a Vπ(1 GHz)= 3.0 V and TBL=47 GHz. This result indicates significant improvement in device performance through the use of a laterally confined modulator design.

TABLE 1

| Design | Length (cm) | $n_{opt}$ | $n_{RF}$ | $Z_{RF'}$ | EO overlap (V/m) |
|---|---|---|---|---|---|
| Haga FIG.4 | 1.15 | 2.1385 | 3.204 | 39.2 | 102,200 |
| Gopalakrishnan FIG. 3 | 2 | 2.1385 | 2.175 | 37.8 | 66,850 |
| Noguchi FIG. 5 | 2 | 2.1385 | 2.144 | 51.3 | 54,000 |

TABLE 1-continued

| Gill FIG. 6 | 2 | 2.1385 | 2.217 | 49.9 | 92,400 |

| Design | RFLoss (dB/cm) | $V_\pi(LF)$ (V) | WO BWL (GHz) | R/F BWL (GHz) | TBL (GHz) |
|---|---|---|---|---|---|
| Haga FIG. 4 | .43 | 4.55 | 10.9 | 7.5 | 7.5 |
| Gopalakrishnan FIG. 3 | .43 | 4.2 | 185 | 8 | 8 |
| Noguchi FIG. 5 | .43 | 5.2 | 1,115 | 1 | 1 |
| Gill FIG. 6 | .43 | 3.0 | 85 | 47 | 47 |

Schematic diagrams of three exemplary structures according to the present invention are shown in FIGS. 7–9. The parameter definitions that apply to FIGS. 7–9 are illustrated in FIG. 7. Parameter 'w' indicates the width of the waveguide ridges (e.g., ridges 702, 704), parameter 'W' indicates the width of the ferroelectric material (e.g., material 706), parameters 'H' and 'G' indicate the height and width of the groove (e.g., groove 708), parameter 'B' indicates the thickness of the buffer layer (e.g., buffer layer 710), and parameter 'T' indicates the thickness of the electrodes (e.g., electrode 712).

FIG. 7 shows a modulator 700 that incorporates a 0.2 μm $SiO_2$ buffer layer 710 that is used to isolate the signal light from the first electrode 714 (located substantially over the first optical waveguide 722), and a second, offset, electrode 720 (located substantially over the second optical waveguide 724), since any overlap between the signal light and the electrode will attenuate the light. The modulator 700 uses a approximately 8 μm wide and 3.5 μm deep groove 708 (illustrated by the H and G parameters in FIG. 7), and the ferroelectric material 706 has a total width of 26 μm (thereby including, but not extending substantially beyond, the first and second waveguides 722 and 724). Note also that the ferroelectric material 706 is bonded to the confining material 716, 718. The modulator 700 ("Gill 1") has a Vπ(LF)=3.0 V and TBL=47 GHz (see Table 2, Gill 1).

The modulator 800 ("Gill 2") in FIG. 8 shows a similar structure except that the laterally confined ferroelectric material 802 width is reduced to approximately 22 μm, which has the effect of reducing the waveguide ridges 804, 806 from 9 μm to 7 μm in width. It is noted that the EO overlap increases as the waveguide ridge becomes narrower. However, reducing these dimensions also reduces the device capacitance. To compensate for the reduction in capacitance, and maintain near velocity matching, the buffer layer 808 may be reduced from 0.2 μm to 0.1 μm thick. This further increases the EO overlap. As in the modulator 700, the modulator 800 includes first and second, offset, electrodes 810, 812 located substantially over the first and second waveguides 814, 816. The modulator 800 has a Vπ(LF)= 2.45 V and a TBL=92 GHz (see Table 2, Gill 2).

FIG. 9 shows a modulator 900 ("Gill 3") in which the laterally confined ferroelectric material 902 was further reduced to 18 μm in width. The reduced device capacitance, caused by narrowing the ferroelectric material 902 width and waveguide ridges 904, 906, is compensated for by eliminating the buffer layer and reducing the groove 908 depth to 2.9 μm. The modulator 900 has a Vπ(LF)=1.80 V and a TBL=210 GHz (see Table 2, Gill 3). Like the modulator 700, the modulator 900 includes first and second offset electrodes 914, 916 located substantially over the first and second waveguides 910, 912.

It is noted that frequencies in excess of 50 GHz, the dielectric losses are expected to contribute appreciably to the total RF propagation losses.

TABLE 2

| Design | Length (cm) | $n_{opt}$ | $n_{RF}$ | $Z_{RF'}$ | EO overlap (V/m) |
|---|---|---|---|---|---|
| Gill 1 | 2 | 2.1385 | 2.217 | 49.9 | 87200 |
| Gill 2 | 2 | 2.1385 | 2.172 | 51.6 | 105100 |
| Gill 3 | 2 | 2.1385 | 2.157 | 52 | 136500 |

| Design | RFLoss (dB/cm) | $V_\pi$(LF) (V) | WO BWL (GHz) | R/F BWL (GHz) | TBL (GHz) |
|---|---|---|---|---|---|
| Gill 1 | .43 | 3.0 | 85 | 47 | 47 |
| Gill 2 | .43 | 2.45 | 200 | 92 | 92 |
| Gill 3 | .43 | 1.8 | 358 | 210 | 210 |

The structures shown in FIGS. 7–9 are z-cut oriented devices, the meaning of which is discussed in more detail below. Preferably, with the elimination of the $SiO_2$ buffer layer, a technique is used to prevent the signal light from being attenuated by the electrodes. Solutions include the use of a transparent conductor as a buffer layer between the waveguide 910 and the electrode 914, or the use of a buffer layer with a dielectric constant similar to that of the ferroelectric material 902. In addition, reducing the width of the waveguide ridges 904, 906 also tends to increase the optical scattering losses and may be partially counterbalanced using buffer layers.

The groove 908 decreases the coupling between the two waveguides 910, 912 in the modulator 900, and preferably is present to provide an acceptable extinction ratio (the ratio of the low, or OFF optical power level to the high, or ON optical power level) in the modulator 900. It is also noted that too deep of a groove can adversely affect the EO overlap and therefore should be considered in determining the most desirable device configuration. The optimization strategy presented below provides a way to address the role of the groove depth.

Figure 10:
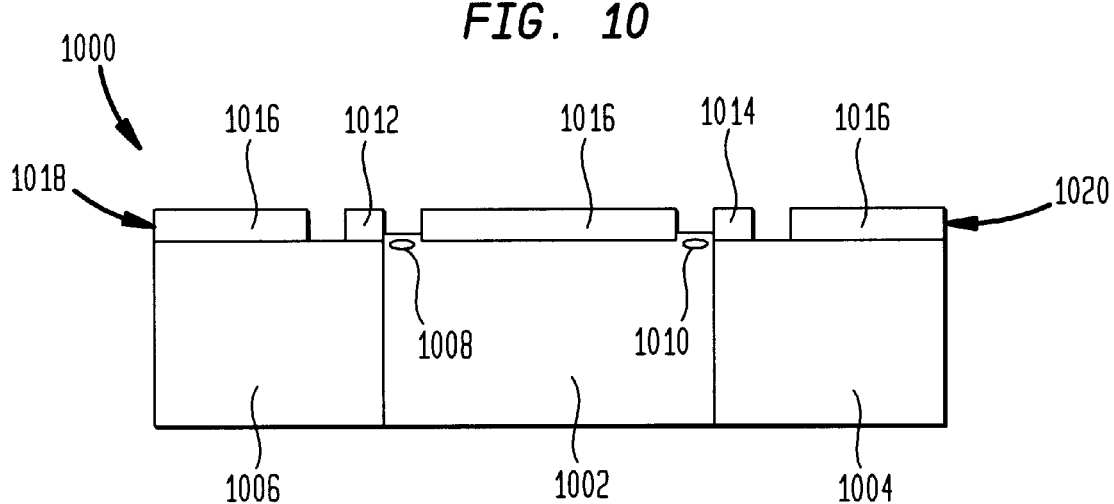
FIG. 10 depicts a symmetric dual drive EO modulator using an X-cut ferroelectric material.
Figure 11:
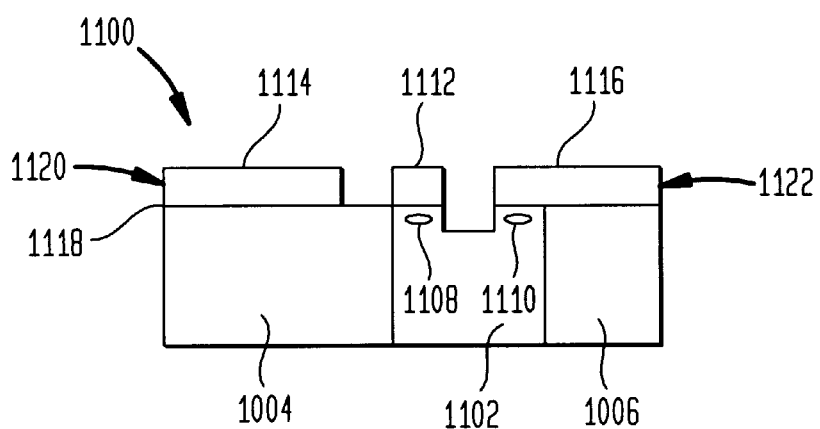
FIG. 11 shows a symmetric coplanar waveguide EO modulator using a Z-cut oriented ferroelectric material.
Figure 12:
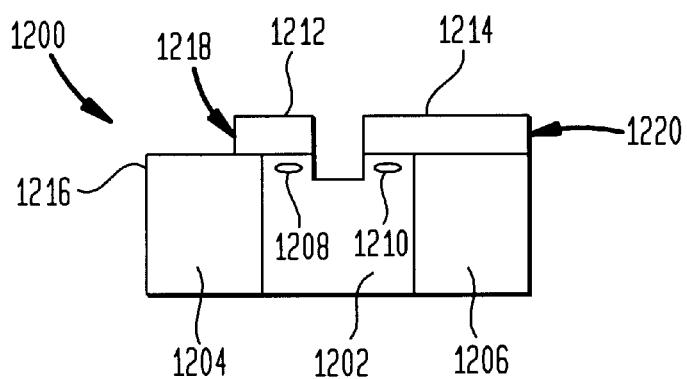
FIG. 12 shows an asymmetric coplanar strip EO modulator using a Z-cut oriented ferroelectric material.
Figure 13:
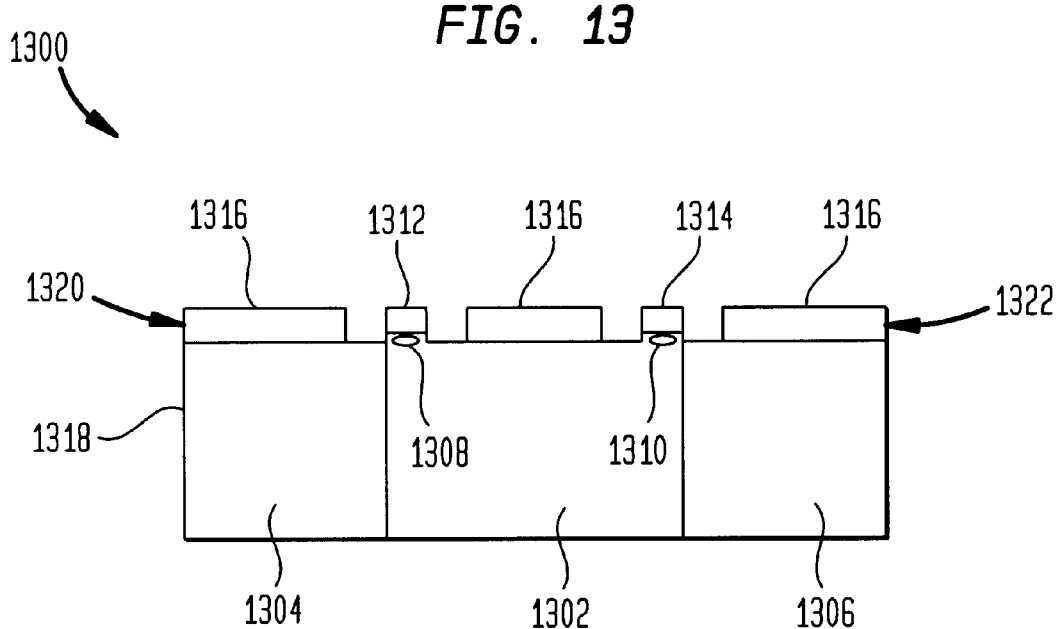
FIG. 13 shows a symmetric dual drive EO modulator using a Z-cut oriented ferroelectric material.

There are a number of design variations that may be implemented to take advantage of the laterally confined design strategy. FIGS. 10–13 show four exemplary modulator designs. FIG. 10 shows a symmetric dual drive electrode configuration 1000 fabricated with an x-cut $LiNbO_3$ crystal orientation (SDD (x-cut)). FIG. 11 shows a symmetric coplanar waveguide electrode configuration 1100 fabricated with a z-cut $LiNbO_3$ crystal orientation (SCP (z-cut)). FIG. 12 shows a asymmetric coplanar strip line electrode configuration 1200 fabricated with a z-cut $LiNbO_3$ crystal (ACPS (z-cut)). FIG. 13 shows a symmetric dual drive electrode configuration 1300 fabricated with a z-cut $LiNbO_3$ crystal (SDD (z-cut)).

It is noted that, in general, an x-cut orientation refers to the x-axis of the ferroelectric oriented vertically in the modulator. The z-axis of the ferroelectric is then horizontal, and the y-axis points into the page for the case of $LiNbO_3$. The z-axis of the ferroelectric film is generally regarded as the axis along which the greatest change in index of refraction occurs in the presence of an RF field; the x-axis shows a somewhat smaller change in index of refraction. In FIG. 10, for example, the x-axis points up to the top of the page, the z-axis points horizontally, and the y-axis points into the page. With respect to the z-cut oriented modulators, the z-axis points up, the y-axis points horizontally, and the x-axis points out of the page.

The signal and ground electrodes are arranged such that the RF field lines (emanating from the signal electrodes to the ground electrodes) run approximately parallel to the z-axis in both types of devices. In a z-cut oriented device, therefore, the first and second electrodes (typically signal and ground electrodes) are offset from one another and located substantially over the optical waveguides. In an x-cut oriented device (see FIGS. 10, 22, 23, and 24, and discussion below), the first and second electrodes may be offset from the optical waveguides. As an example, the signal electrode may be located between the optical waveguides, or disposed laterally from the optical waveguides. The greatest change in the index of refraction in the ferroelectric film is thus induced.

Returning to the Figures, FIG. 10 shows an x-cut oriented modulator 1000 including a ferroelectric material 1002, confining material 1004, 1006, and waveguides 1008, 1010. Additionally, the modulator 1000 includes a first signal electrode 1012, a second signal electrode 1014, and ground electrodes 1016. The first signal electrode 1012 and second signal electrode 1014 both carry the RF input signal, thus the nomenclature "dual drive". The RF field lines that extend (horizontally through the film z-axis) from the (dual drive) signal electrodes 1012, 1014 induce the change (in opposite directions for maximal effect) in index of refraction in the ferroelectric material 1002. Note that in FIG. 10, the electrodes 1012 and 1014 are offset from one another and the waveguides 1008, 1010 and are further offset from the ground electrodes 1016. The ferroelectric material in the present modulator design generally extends less far (i.e., is confined) than the furthest extent of the electrode structure (i.e., the outermost electrodes) to either side (assuming a cross-sectional view of the interaction region with the propagation direction of the optical and RF fields perpendicular to the cross section). Thus, the ferroelectric material 1002 is confined on the left from extending beyond the furthest extent of the electrode 1016 to the left (edge 1018). Additionally, or alternatively, the ferroelectric material 1002 may be confined on the right from extending beyond the furthest extent of the electrode 1016 to the right (edge 1020).

Turning now to FIG. 11, the modulator 1100 presents a z-cut oriented design that generally includes a ferroelectric material 1102, confining material 1104, 1106, and waveguides 1108, 1110. A signal electrode 1112 (located substantially over the waveguide 1108) is provided and offset from the ground electrode 1114 and ground electrode 1116 (which is located substantially over the waveguide 1110). A buffer layer 1118 is also present underneath the electrodes 1112, 1114, 1116. The ferroelectric material 1102 is confined on the left from extending beyond the furthest extent of the electrode 1114 to the left (edge 1120). Additionally, or alternatively, the ferroelectric material 1102 may be confined on the right from extending beyond the furthest extent of the electrode 1116 to the right (edge 1122).

Turning to FIG. 12, the modulator 1200 generally includes a ferroelectric material 1202, confining material 1204, 1206, and waveguides 1208, 1210. A signal electrode 1212 (located substantially over the waveguide 1208) is provided in addition to and offset from a ground electrode 1214 (located substantially over the waveguide 1210). A buffer layer 1216 is also provided under the electrodes 1212 and 1214. The ferroelectric material 1202 is confined on the left from extending beyond the furthest extent of the electrode 1212 to the left (edge 1218). Additionally, or alternatively, the ferroelectric material 1202 may be confined on the right from extending beyond the furthest extent of the electrode 1214 to the right (edge 1220).

Similarly, the modulator 1300 in FIG. 13 generally includes a ferroelectric material 1302, confining material 1304, 1306, and waveguides 1308, 1310. Dual drive signal electrodes 1312 and 1314 are provided in addition to the ground electrodes 1316. A buffer layer 1318 is also provided. External circuitry (not shown) is used to provide a 180 degree phase shift between copies of the signals carried on the dual drive signal electrodes 1312 and 1314. Thus, the signals effect the portions of ferroelectric material 1302 supporting the waveguides in opposite directions to produce a net change in the waveguide optical path lengths (rather than producing equal changes (i.e., no net change) in the waveguide optical path lengths in the ferroelectric material 1302). The ferroelectric material 1302 is confined on the left from extending beyond the furthest extent of the electrode 1316 to the left (edge 1320). Additionally, or alternatively, the ferroelectric material 1302 may be confined on the right from extending beyond the furthest extent of the electrode 1316 to the right (edge 1322).

In each of the devices illustrated above, the buffer layers may be fabricated as individual sections under the electrodes, or as a continuous film.

Figure 14:
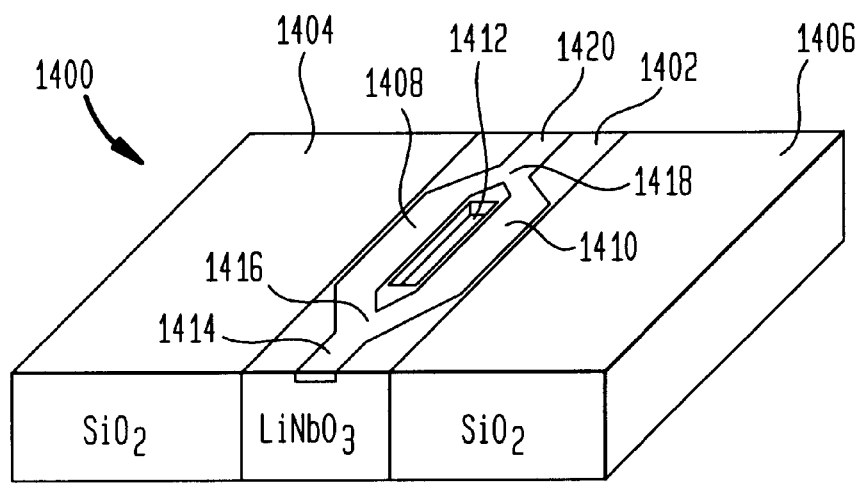
FIG. 14 shows a perspective view of an EO modulator (before fabrication of the modulator electrodes) according to the present invention.
Figure 15:
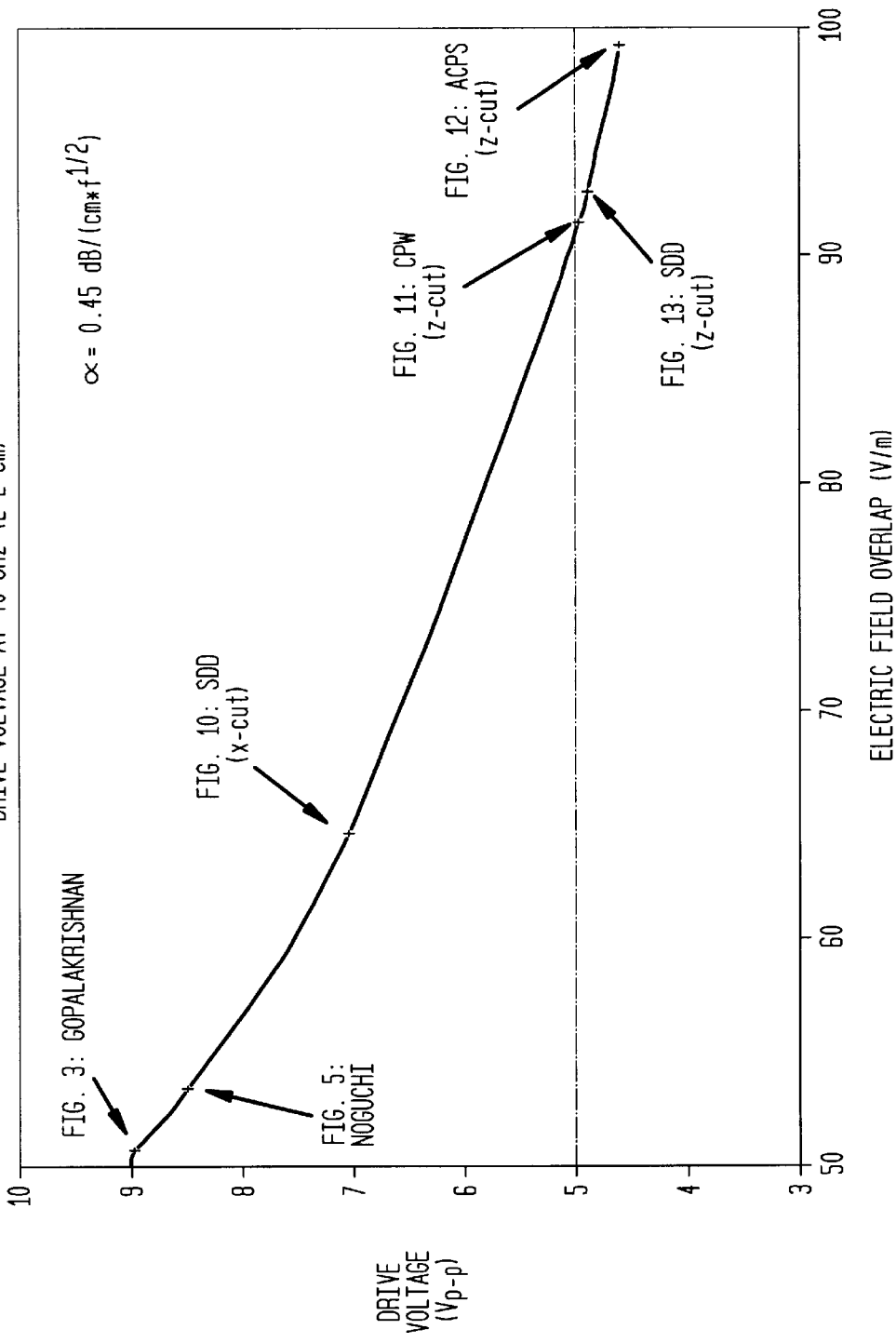
FIG. 15 shows the expected drive voltage for full modulation at 40 GHz operation for previously reported devices against the present laterally confined modulator designs, for each of the design types shown in FIGS. 10–13.
Figure 16:
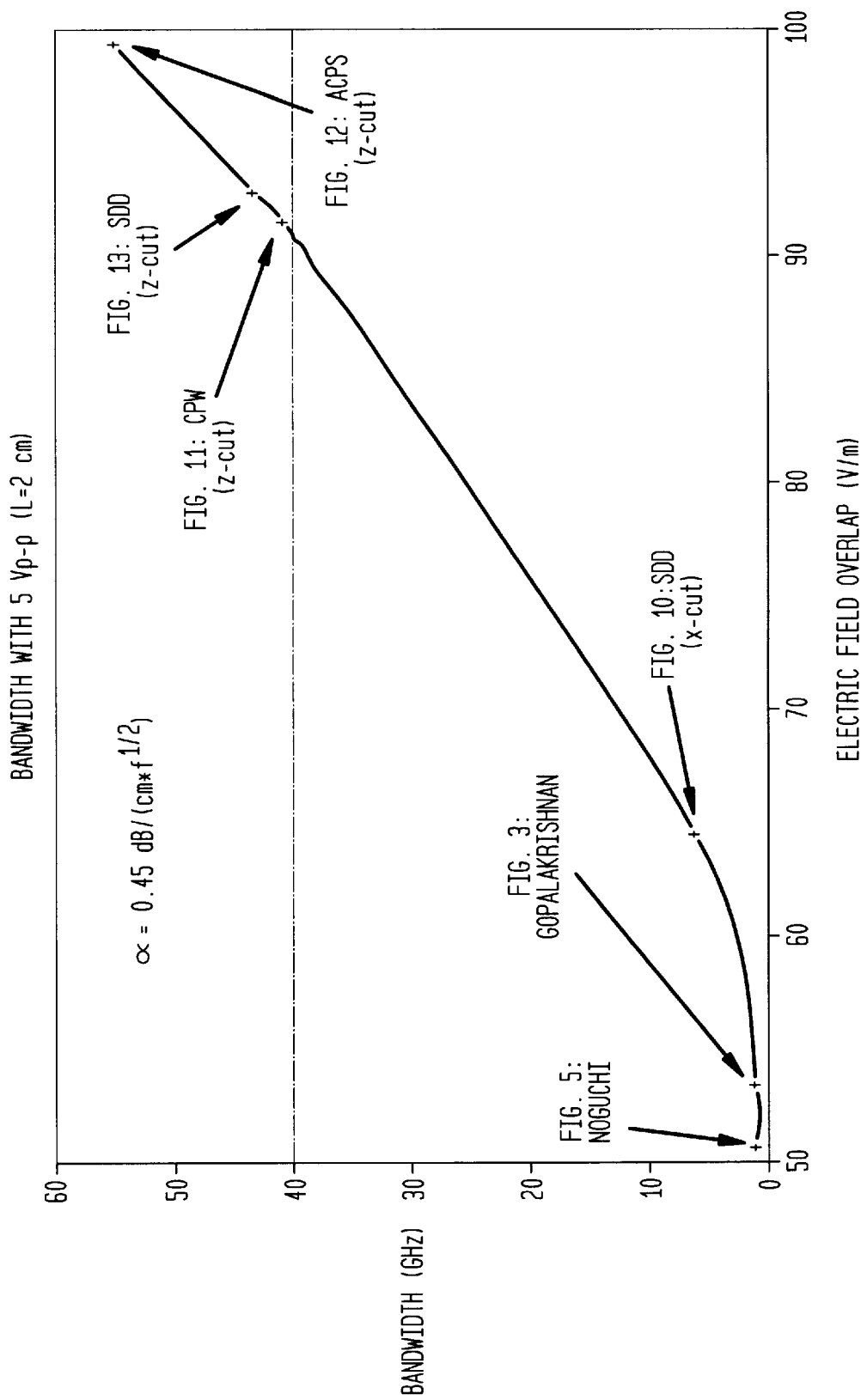
FIG. 16 shows the frequency at which full modulation may be achieved with a 5 $V_{p-p}$ applied AC potential for previously reported devices and the present laterally confined modulator designs, for each of the design types shown in FIGS. 10–13.

FIG. 14 shows a perspective view 1400 of several structural elements also shown in the cross-section FIGS. 10–13, including the ferroelectric material 1402, confining material 1404, 1406, waveguides 1408, 1410, and groove 1412. The expected performance of each device is shown in FIGS. 15 and 16. The following geometric dimensions were used when determining the performance of these structures. For the SDD (x-cut), FIG. 10: B=0, G=13 $\mu$m, H=1.5 $\mu$m, w=13 $\mu$m, W=100 $\mu$m, T=10 $\mu$m. For the CPW (z-cut), FIG. 11: B=0.1 $\mu$m, G=15 $\mu$m, H=3.6 $\mu$m, w=8 $\mu$m, W=31 $\mu$m, T=10 $\mu$m. For the SDD (z-cut), FIG. 13: B=0.2 $\mu$m, G=20 $\mu$m, H=3.5 $\mu$m, w=8 $\mu$m, W=130 $\mu$m, T=18 $\mu$m. Finally, for the ACPS (z-cut), FIG. 12: B=0.1 $\mu$m, G=7.5 $\mu$m, H=3.6 $\mu$m, w=8 $\mu$m, W=24 $\mu$m, T=20 $\mu$m.

These parameters are defined in FIG. 7.

FIGS. 15 and 16 show that the performances of the z-cut oriented devices are generally better than that of the x-cut oriented device. This is primarily due to constraints imposed on the design of the electrodes by the impedance and velocity matching conditions, and also RF propagation loss considerations. These conditions restrict the electrode gap to certain dimensions that tend to reduce the EO overlap in the x-cut design much more than in the z-cut designs.

The symmetric dual drive design shown in FIG. 13 is of particular interest because it not only shows enhanced performance but also offers advantages with regard to device fabrication. The symmetric dual drive design has a ground electrode between the two waveguides 1308, 1310 in the modulator 1300. The advantage given by this design is that the size of the ground electrode, and therefore the width of the ferroelectric material 1302 may be made arbitrarily large without affecting the RF propagation constant of the device interaction region. Therefore, the width of the ferroelectric material 1302 in this design can be on the order of hundreds of microns. This significantly simplifies device fabrication and also improves processing throughput, because crystals with a thickness of hundreds of microns are much more robust than crystals with a thickness of tens of microns.

Figure 17:
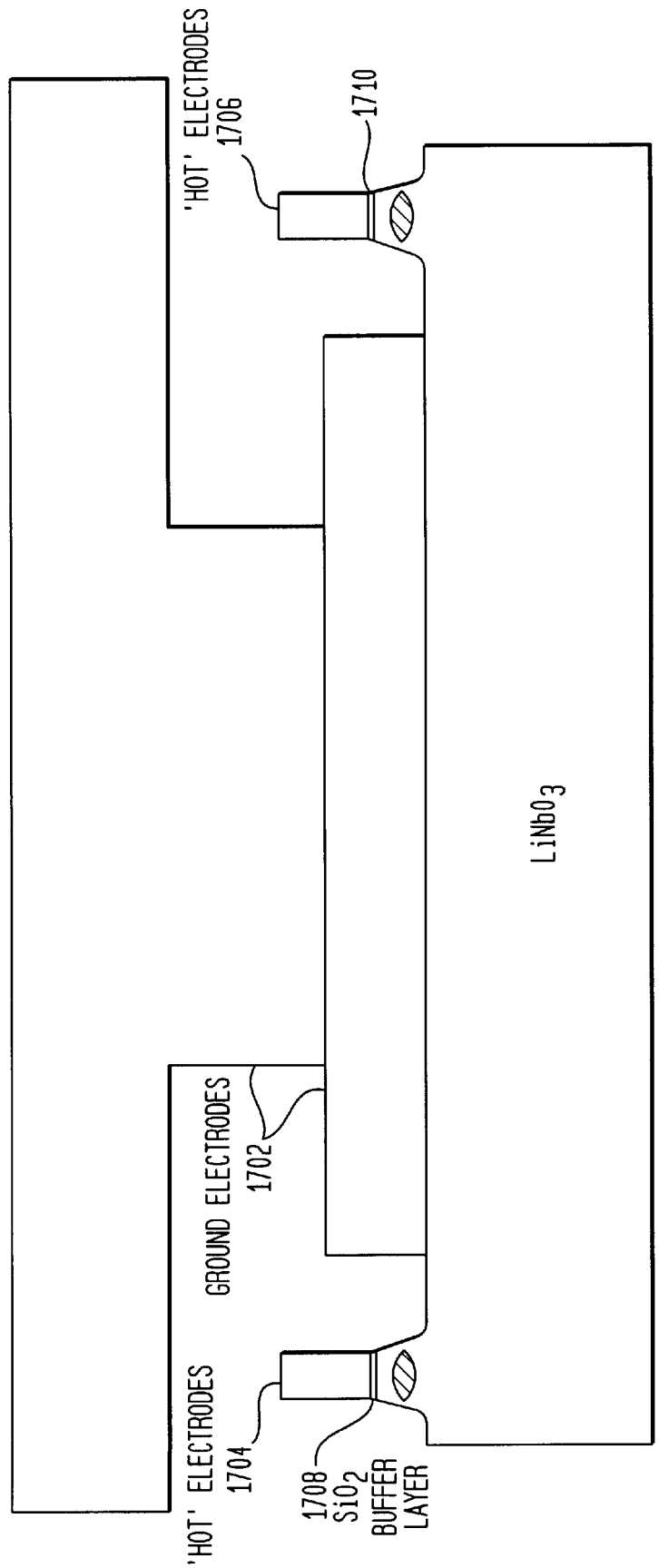
FIG. 17 provides an illustration of an EO modulator design that eliminates the buffer layer between the ground electrode and ferroelectric and also the low dielectric constituent of the substrate in the laterally confined modulator design.
Figure 18:
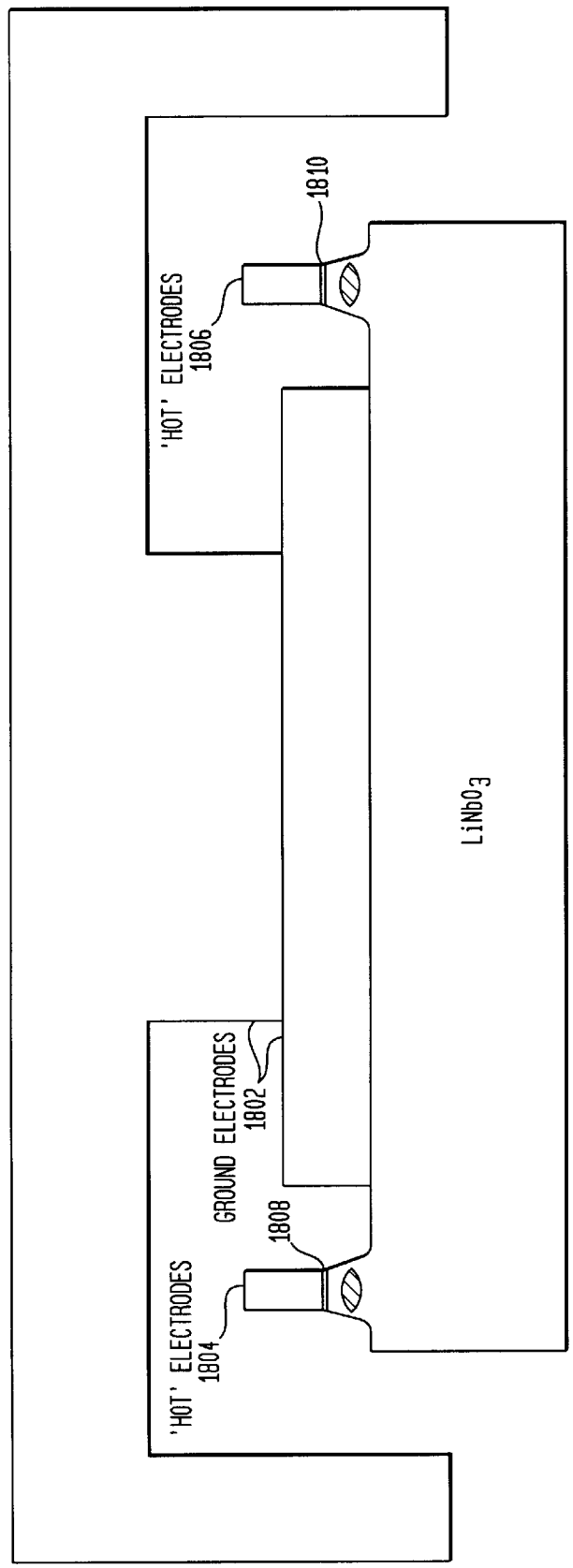
FIG. 18 provides a second illustration of an EO modulator design that eliminates the buffer layer between the ground electrode and ferroelectric and also the low dielectric constituent of the substrate in the laterally confined modulator design.
Figure 19:
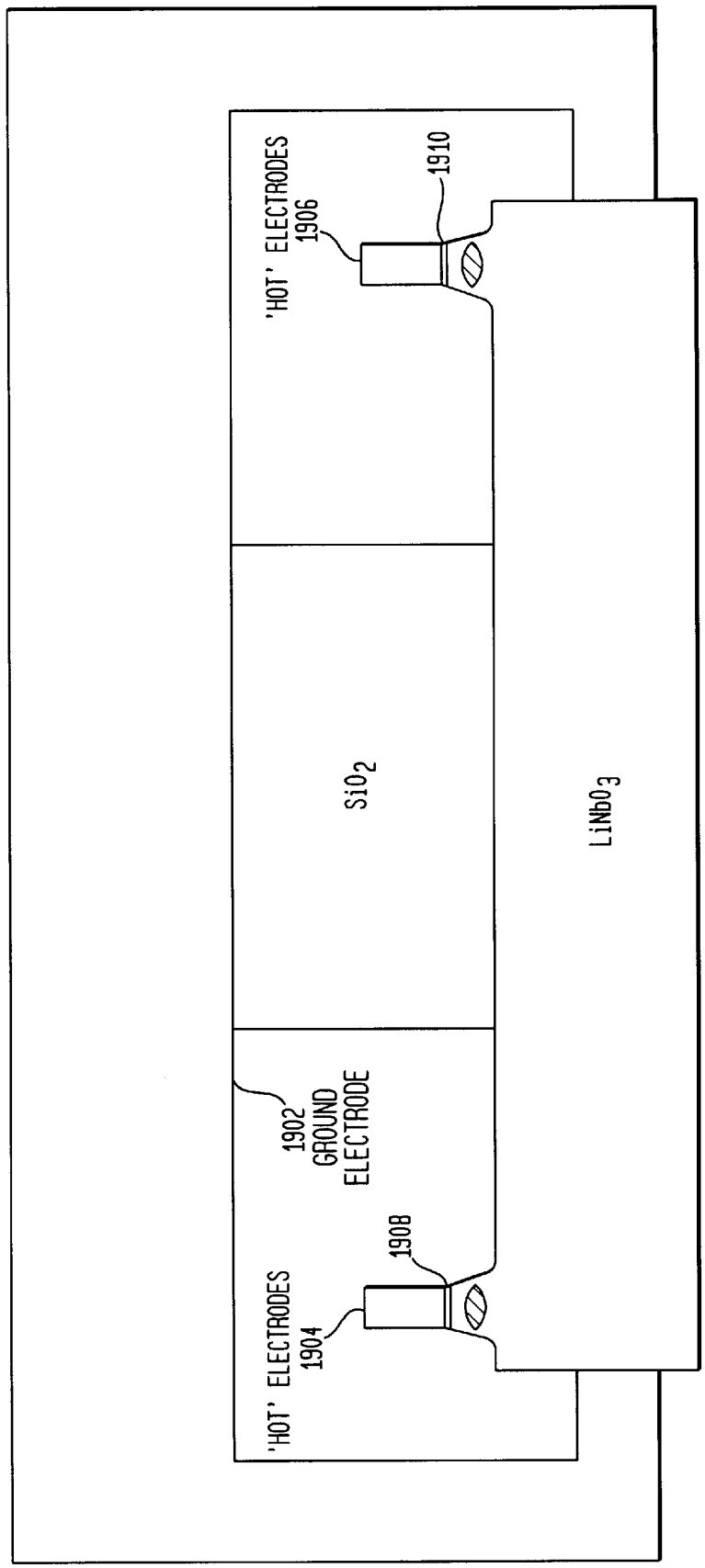
FIG. 19 provides a third illustration of an EO modulator design that eliminates the buffer layer between the ground electrode and ferroelectric and also the low dielectric constituent of the substrate in the laterally confined modulator design.

The confining material of the composite substrate is present for mechanical stability and ease of processing. However, electrode configurations may be used in which the two outer ground planes of the symmetric dual drive design 1300 can be replaced by another type of structure, or removed all together. In this case, the confining material itself is not needed. Examples of such designs are shown in FIGS. 17–19, which illustrate ground electrodes 1702, 1802, 1902; "Hot" (RF signal) electrodes 1704, 1706, 1804, 1806, and 1904, 1906; and electrode buffer layers 1708, 1710, 1808, 1810, and 1908, 1910 present only underneath the signal electrodes. Each of the particular arrangements of the ground electrodes in FIGS. 17–19 encourages distribution of current near the top of the hot electrodes 1704, 1706, 1804, 1806, and 1904, 1906 in addition to their sides. RF propagation losses are thus reduced and enhanced performance results.

Figure 20:
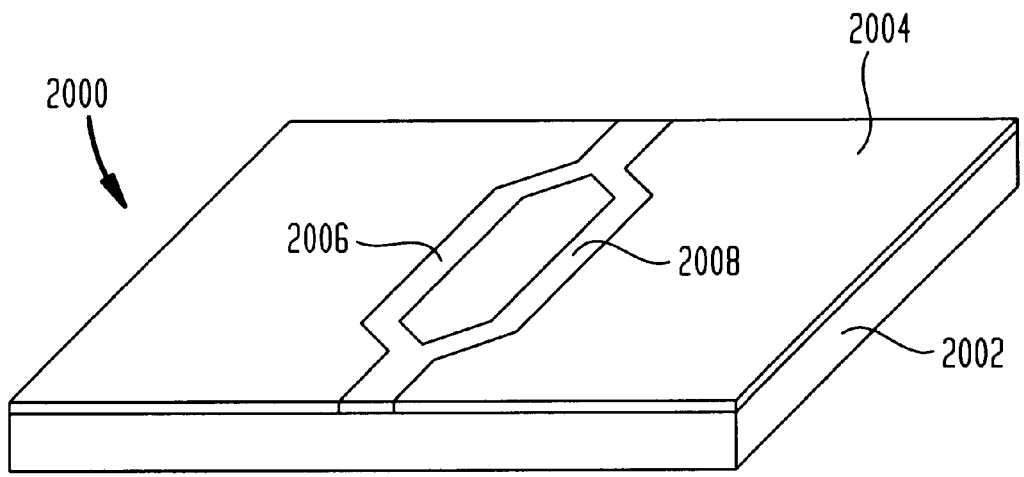
FIG. 20 illustrates an X-cut oriented thin film EO modulator design before etching and before electrode fabrication.
Figure 21:
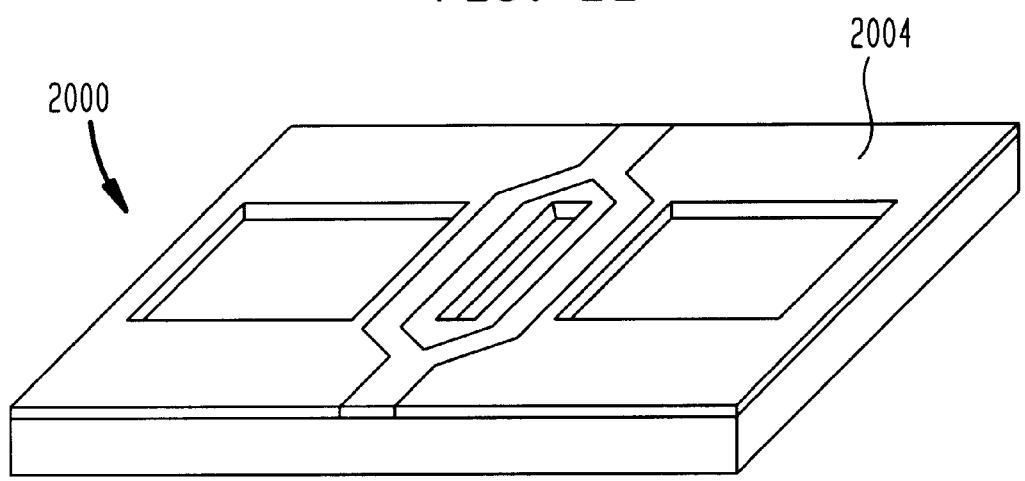
FIG. 21 illustrates an X-cut oriented thin film EO modulator design after etching and before electrode fabrication.
Figure 22:
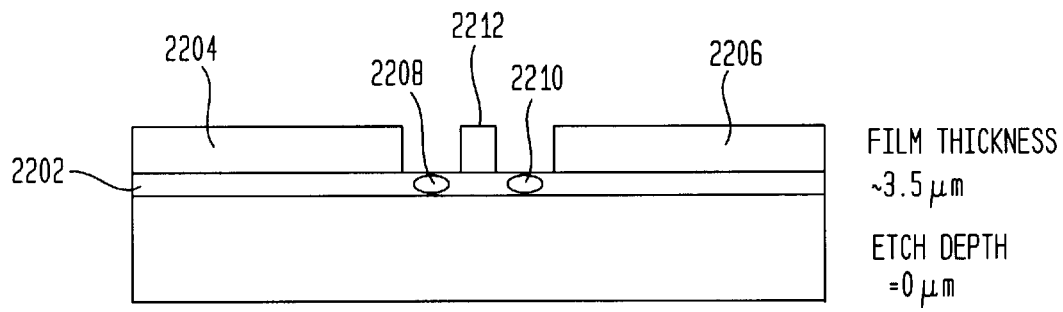
FIG. 22 shows several design parameters for an x-cut oriented $LiNbO_3$ thin film EO modulator design before etching.
Figure 23:
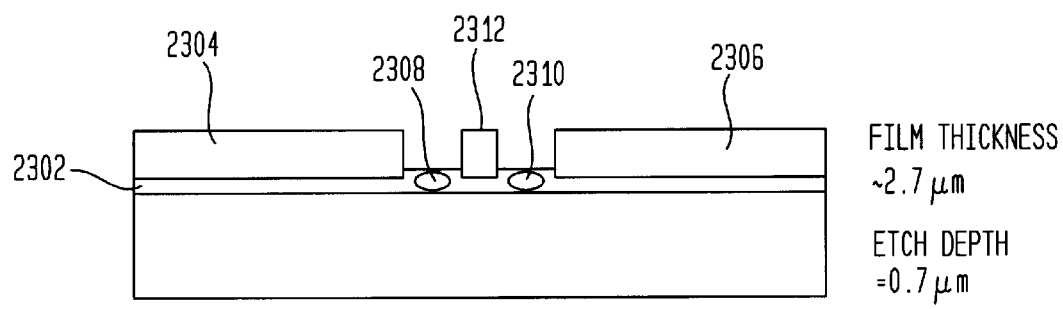
FIG. 23 shows several design parameters for an x-cut oriented $LiNbO_3$ thin film EO modulator design after etching to a certain depth.
Figure 24:
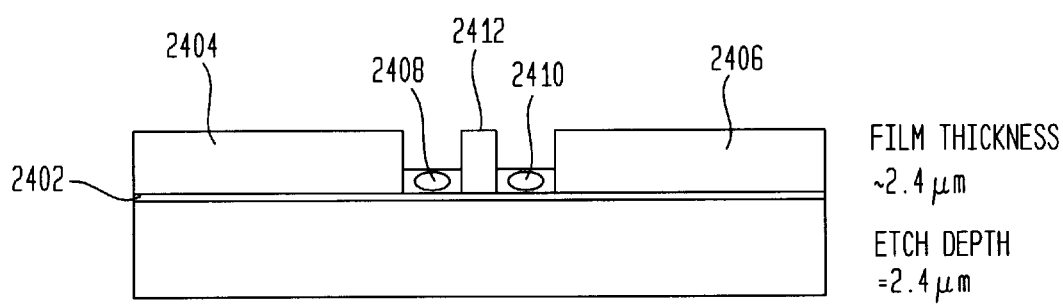
FIG. 24 shows another set of design parameters for an x-cut oriented $LiNbO_3$ thin film EO modulator design after fully etching the film.

Turning now to thin film designs, generally indicated in FIG. 20 is a perspective view of a thin ferroelectric film configuration 2000 including a substrate 2002, a thin film 2004, and first and second optical waveguides 2006 and 2008. The thin ferroelectric film (which may be less than 5 $\mu$m in thickness), may, for example, be formed using a sputtering or chemical vapor deposition (CVD) technique. FIG. 21, illustrates the configuration 2000 after etching of the thin ferroelectric film 2004 (but before metalization to form electrodes). Schematic diagrams of three x-cut ferroelectric thin film modulators 2200, 2300, and 2400 are shown in FIGS. 22–24.

Each of the modulators include optical waveguides 2208, 2210; 2308, 2310, and 2408, 2410, respectively. Note that for each device, the ferroelectric film 2202, 2302, 2402 is etched down away from the optical waveguides 2208, 2210, 2308, 2310, 2408, and 2410 to varying degrees. The ferroelectric film 2202, 2302, and 2402 thus has a first thickness for supporting the waveguides 2208, 2210; 2308, 2310, and 2408, 2410 and a second thickness (which may be zero) away from the waveguides. The electrodes in each modulator are offset from one another, and the waveguides. The ferroelectric film 2202, 2302, 2402 may, for example, be built on and supported by a substrate having a low dielectric constant, low dielectric loss and an index of refraction lower than the film. As an example, fused quartz may be used as the substrate.

The reduction in the amount of ferroelectric film 2302, 2402 away from the waveguides 2308, 2310, 2408, and 2410 effectively laterally confines the ferroelectric film. In FIG. 22, for example, the ferroelectric film 2202 is not etched away from the waveguides 2208, 2210, and thus there is no lateral confinement of the ferroelectric film 2202. In FIG. 23, the ferroelectric film 2302 is etched to a depth of approximately 0.7 $\mu$m and provides increased lateral confinement. In FIG. 24, the ferroelectric film 2402 is etched completely from the region away from the waveguides 2408 and 2410 and thereby provides the greatest confinement. Gradual increases in the etch depth result in gradual increases in lateral confinement and resultant performance.

Figure 25:
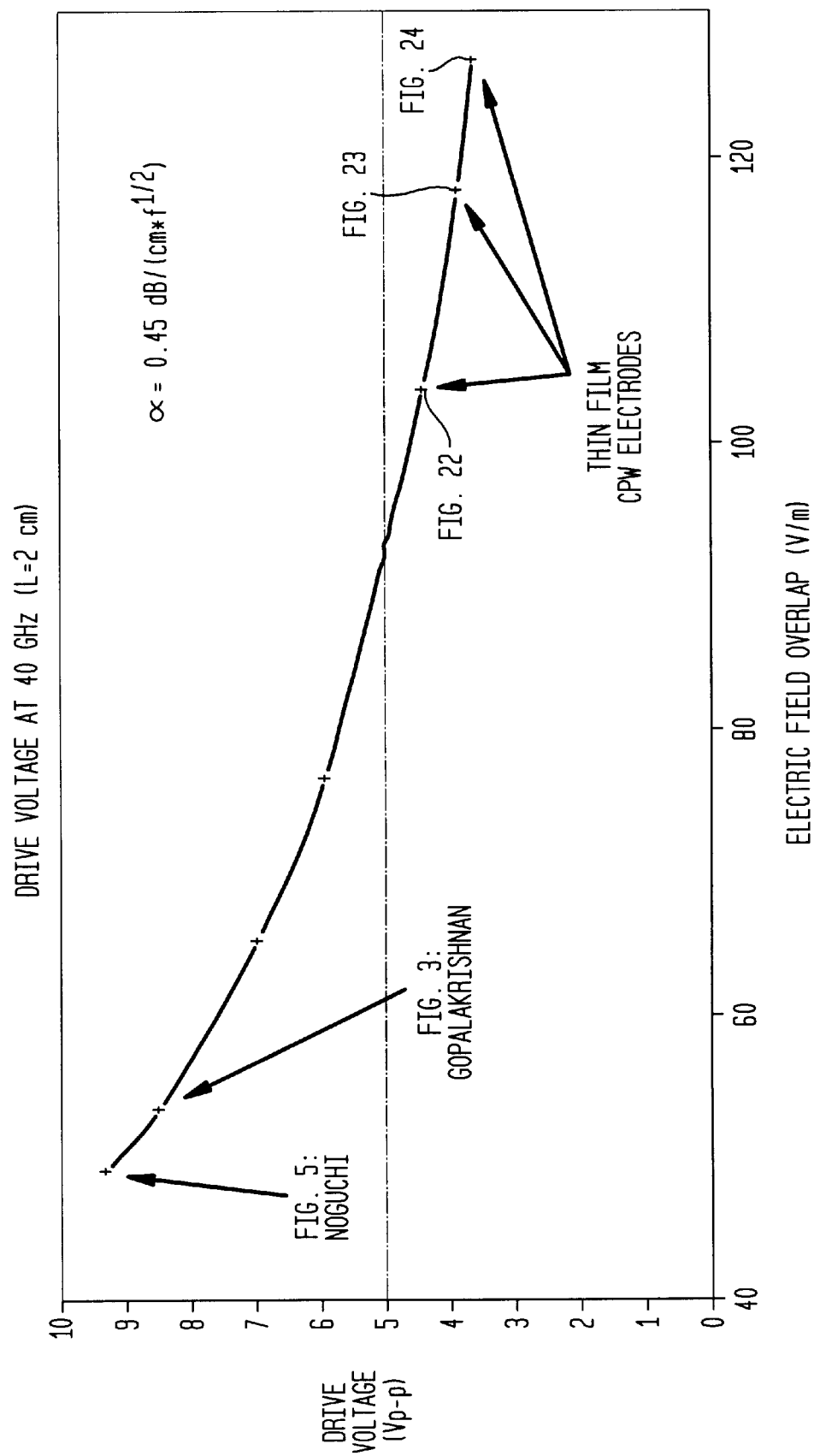
FIG. 25 shows the expected drive voltage needed for full modulation at 40 GHz operation for previously reported devices and the designs shown in FIGS. 22–24. Each data point is labeled indicating which data point is associated with each design type.
Figure 26:
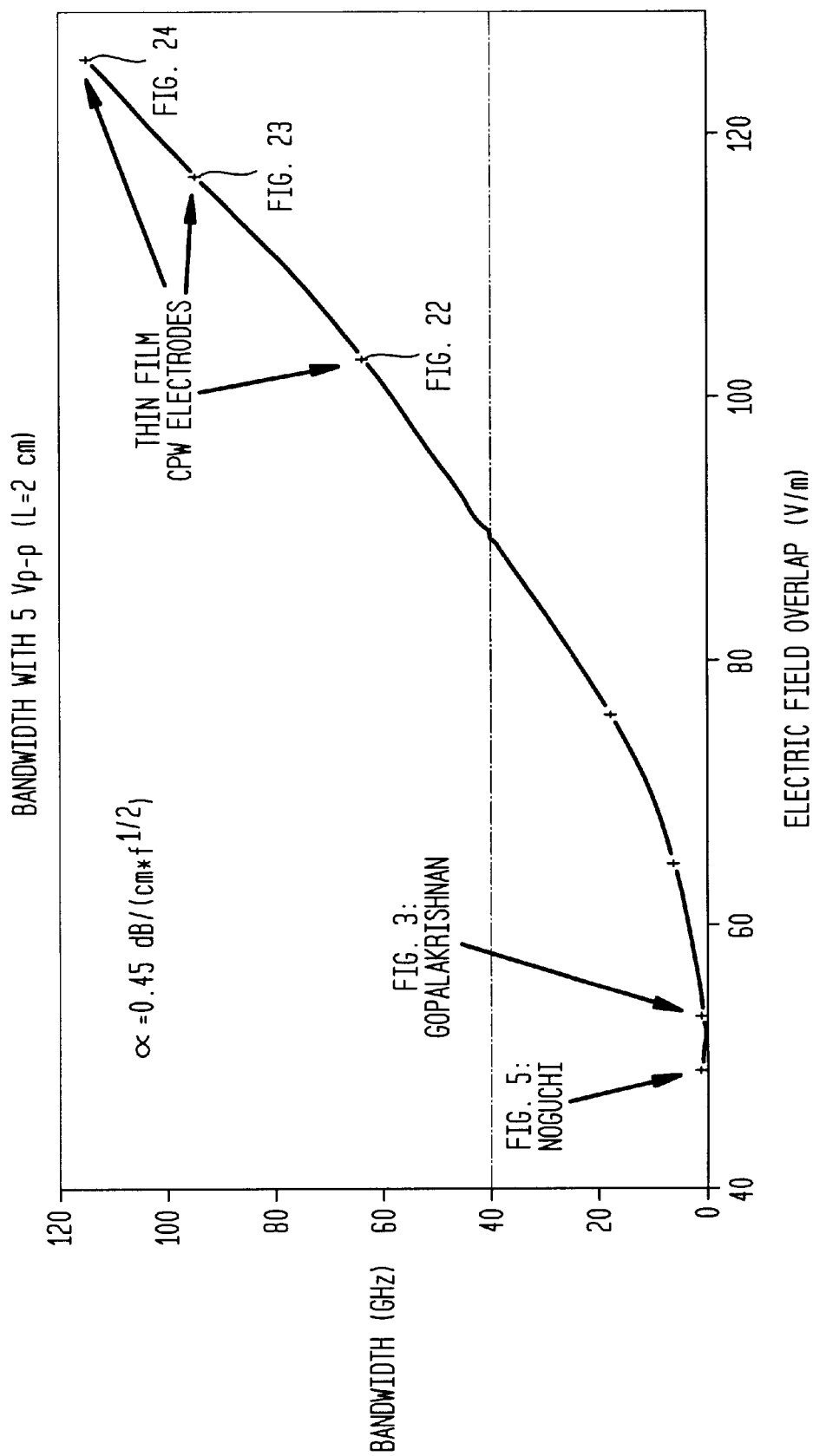
FIG. 26 shows the frequency at which full modulation may be achieved with a 5 $V_{p-p}$ applied AC potential for several previously reported devices and the design types shown in FIGS. 22–24.

FIGS. 25 and 26 show the projected performance from each of the modulators 2200, 2300, and 2400. The EO overlap, and the total bandwidth limit in the modulators increases as the etch depth under the electrodes increases (or stated alternatively, as the lateral confinement increases). It is further noted that the overall film thickness is preferably reduced as the etch-depth is increased in order to maintain the velocity and impedance matching conditions. The optical scattering losses of the waveguides tend to increase as the thickness of the thin film is decreased, because the confinement of the light in the vertical direction will increase and this generally increases waveguide propagation losses. Therefore, the optimization of such a design is dependent on balancing both the bandwidth and the optical scattering losses of the device.

Figure 27:
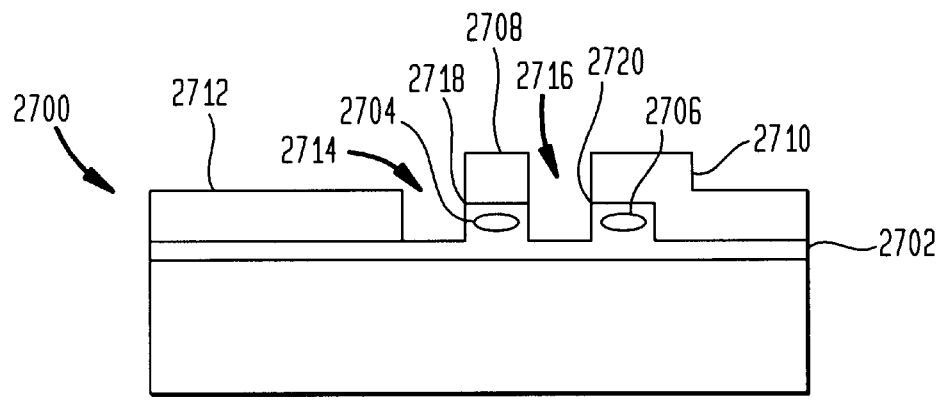
FIG. 27 illustrates a symmetric coplanar waveguide thin film modulator design using a Z-cut oriented ferroelectric film EO modulator.
Figure 28:
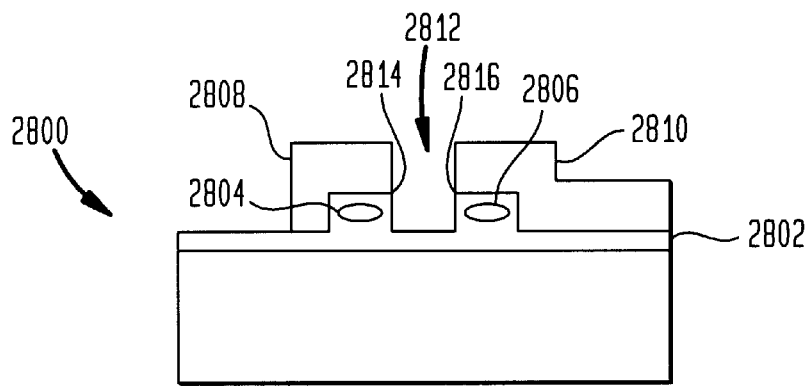
FIG. 28 illustrates an asymmetric coplanar strip thin film modulator design using a Z-cut oriented ferroelectric film EO modulator.
Figure 29:
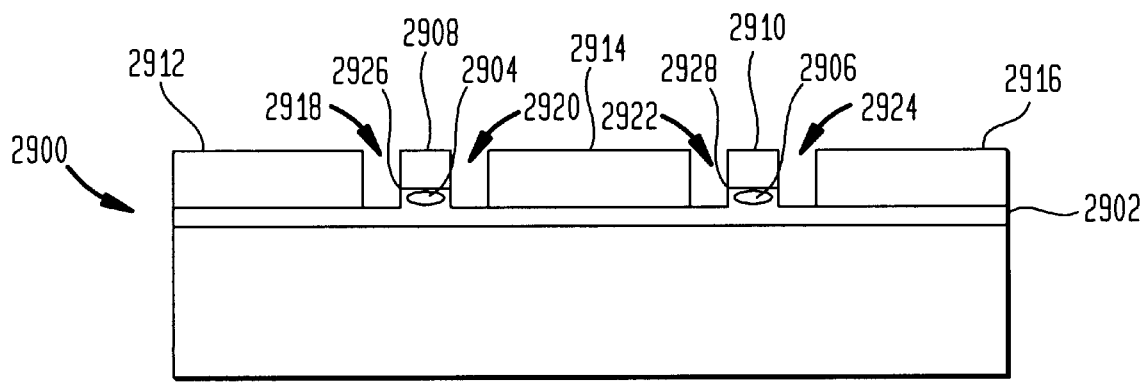
FIG. 29 illustrates a symmetric dual drive thin film modulator design using a Z-cut oriented ferroelectric film EO modulator.

As illustrated in FIGS. 27–29, thin ferroelectric film designs can also be applied to z-cut $LiNbO_3$ modulators 2700, 2800, and 2900 with the benefits discussed above for the non-thin-film bulk-grown z-cut modulators 1100, 1200, and 1300. FIGS. 27–29 illustrate etching away from the optical waveguides in the modulators 2700, 2800, 2900, similar to that shown in FIGS. 23–24, resulting in lateral confinement of the active layer. In other words, in FIGS. 27–29, the modulators 2700, 2800, 2900 have a reduced ferroelectric thickness (compared to the thickness supporting the waveguides) in the electrode gaps 2714, 2716, 2812, and 2918–2924.

The modulator 2700 of FIG. 27 generally includes a ferroelectric film 2702, waveguides 2704, 2706, signal electrode 2708, ground electrodes 2710, 2712, and electrode gaps 2714, 2716. The ferroelectric film 2702 is preferably etched to increase lateral confinement (as shown in FIGS. 23–24). The modulator 2700 may use etching away from the waveguides 2704 and 2706 to provide effective lateral confinement of the ferroelectric film 2702. As with the devices illustrated above, buffer layers 2718, 2720 may be used underneath the electrodes 2708, 2710 and fabricated as a continuous section, or as individual sections.

Similarly, the modulator 2800 of FIG. 28 generally includes a ferroelectric film 2802 (preferably etched), waveguides 2804, 2806, signal electrode 2808, a ground electrode 2810, and an electrode gap 2812. The modulator 2800 may use etching away from the waveguides 2804 and 2806 to provide effective lateral confinement of the ferroelectric film 2802. In particular, the modulator 2800 includes a reduced ferroelectric thickness (in comparison to the thickness supporting the waveguides 2804, 2806) in the electrode gap 2812. Buffer layers 2814, 2816 are preferably used underneath the electrodes 2808, 2810 and fabricated as a continuous section, or as individual sections.

The modulator 2900 of FIG. 29 generally includes a ferroelectric film 2902 (preferably etched), waveguides 2904, 2906, dual drive signal electrodes 2908, 2910, ground electrodes 2912, 2914, 2916, and electrode gaps 2918–2924. The modulator 2900 may use etching away from the waveguide 2904 and 2906 to provide effective lateral confinement of the ferroelectric film 2902. Again, buffer layers 2926, 2928 are preferably used underneath the electrodes 2908, 2910 and fabricated as a continuous section, or as individual sections The velocity matching condition is preferably achieved with bulk grown $LiNbO_3$ by using the laterally confined design shown in FIGS. 11–13. The lateral confinement of the thin film ferroelectric significantly improves device performance for this type of structure.

The use of a substrate that incorporates laterally confined $LiNbO_3$ significantly improves the half wave voltage and bandwidth limit of a modulator. This design also offers the advantage of using bulk grown materials. The modulator designs presented within may be further optimized for individual applications and convey the fundamental concepts involved with, and general benefits derived from, employing a laterally confined geometry in an electro-optic modulator design. The designs presented are not intended to limit the scope of coverage derived from the preceding text, but rather are meant only to be viewed as representative examples.

Figure 30:
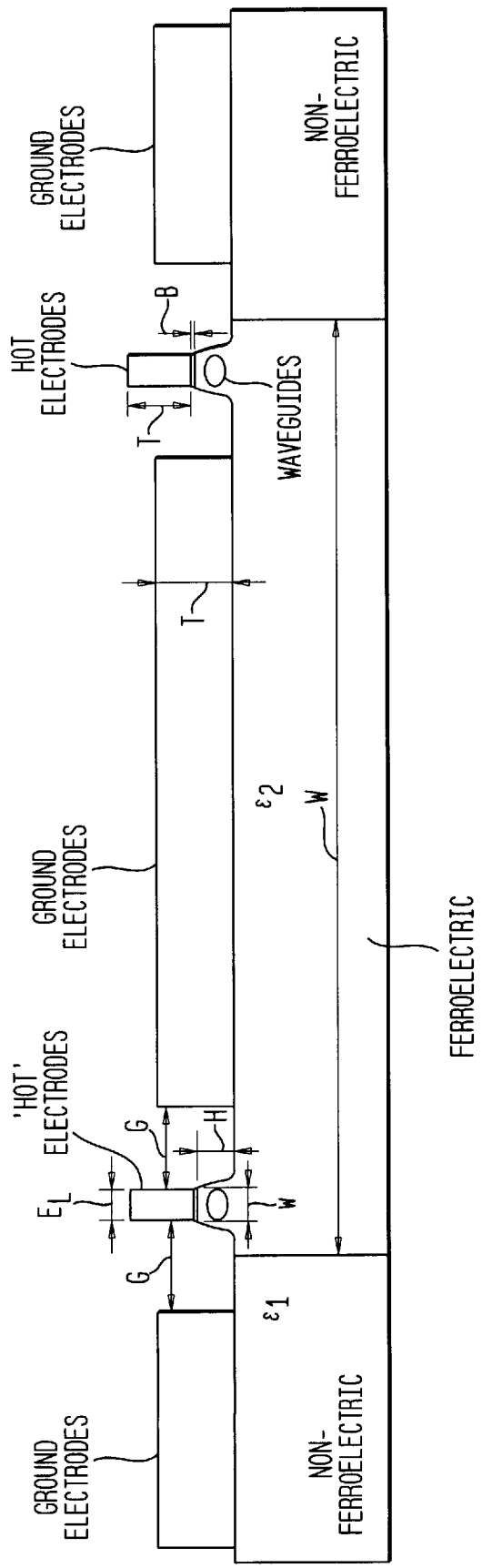
FIG. 30 depicts the parameters that may be treated in optimizing an EO modulator according to the present invention.

A laterally confined modular design can be optimized as follows: The procedure outlined below was specifically applied to a $LiNbO_3$ ferroelectric material and fused quartz confining material with an ACPS electrode configuration. With reference to FIG. 30 and Table 3, the relevant terms are defined.

TABLE 3

| Parameter | Definition |
| --- | --- |
| $\epsilon_1$ | Dielectric constant of the non-ferroelectric confining material used in the composite substrate (typically a low dielectric material) |
| $\epsilon_2$ | Dielectric constant of the active ferroelectric material (in this case $LiNbO_3$) |
| $E_L$ | Width of the 'hot' electrode |
| G | Electrode gap |
| H | Depth of the excavated groove between the modulator waveguides |
| T | Electrode thickness |
| w | Width of the waveguide ridge |
| W | Total width of the $LiNbO_3$ in the composite structure |
| $C_o$ | Line capacitance that the electrodes would have if they were floating in air |
| C | Line capacitance of the modulator device |

The constant $\epsilon_2$ is the dielectric constant of the ferroelectric material and is assumed to be relatively high. It is noted that $\epsilon_2$ must generally be greater than $(n_{opt})^2$, where $n_{opt}$ is the optical refractive index of the active crystal, for there to be any need to use the laterally confined modulator design. The parameter $\epsilon_1$ is the dielectric constant of the confining material and $\epsilon_1 < \epsilon_2$. The following geometric dimensions (Table 4) represent examples of the ranges of design parameters that may be used for device fabrication of the present electro-optic modulator design.

TABLE 4

| Parameter Ranges |
| --- |
| $1 < \epsilon_1 < 20$ |
| $10 < \epsilon_2 < 4000$ |
| $\epsilon_1 < \epsilon_2$ |
| $0 < B < 2\ \mu m$ |
| $1\ \mu m < E_L < 50\ \mu m$ |
| $1\ \mu m < G < 200\ \mu m$ |
| $0.5\ \mu m < H < 10\ \mu m$ |
| $0.5\ \mu m < T < 50\ \mu m$ |
| $W < 1\ mm$ |
| $0.5 < w < 30\ \mu m$ |

One fabrication consideration is the determination of an acceptable extinction ratio in the modulator. This is controlled by the waveguide separation, and the width and depth of the modulator groove. The width of the modulator groove, in this case, is assumed to be equal to the electrode gap. The smaller the waveguide separation, the smaller the electrode gap, and the higher the electric field in the crystal for a given applied voltage. Therefore, it is preferable to make the waveguides as close together as possible while maintaining an acceptable extinction ratio. The waveguide separation then dictates the electrode gap distance. The electrode gap distance, in turn, influences the 'hot' electrode thickness, T, and width, $E_L$. These parameters may be determined by satisfying the velocity matching and line impedance matching requirements. The impedance and velocity matching requirements indicate what $C_o$ may be.

In addition, the RF losses are also determined by the electrode thickness and shape. For minimal electrode losses the electrodes are preferably thick and the angle that the inner walls of the electrodes make with respect to the plane of the wafer carefully controlled. Therefore, the electrode can be as thick as possible while $E_L$ is varied to satisfy the $C_o$ condition. The desired value of C is also determined by the impedance and velocity matching conditions. A suitable value for C may be obtained by modifying the geometric dimensions of the composite substrate.

The substrate may be modified by changing the optical waveguide width, w, the groove depth, H, and the thickness of the buffer layer, B. However it is noted that the groove depth is also dictated by the device extinction ratio and thus restrict the acceptable modifications to the groove depth. In general, it is preferable to have as thin a buffer layer (used to avoid attenuation of the optical signal by the electrode) as possible to maximize the electric field present in the crystal for a given applied voltage. Therefore, the use of the minimum possible buffer layer thickness is assumed. The waveguide ridge width, w may then be adjusted to achieve the proper value for C.

Application constraints will also have an influence on the specific allowable geometric configuration. The waveguide ridge width, w, and waveguide confinement has a strong effect on the optical scattering in the RF/optical interaction region. The waveguide confinement also affects the fiber-device coupling losses. Therefore, when the waveguide width, w, is adjusted to achieve the desired C, the optical insertion losses of the device are considered. If the optical insertion losses are too high then w is preferably made larger. The buffer layer may then be made thicker to compensate for the increase in C that occurs when w is increased. It is, however, noted that increasing the buffer layer thickness generally reduces the RF/optical overlap and ultimately reduces device performance.

For instance, the geometry can be adjusted to optimize the device. The electrode thickness may be increased to reduce the RF propagation losses which may result in the electrode gap being widened to maintain $C_o$ at a desired value. These changes may also affect other aspects of device performance and the device geometry may therefore be further adjusted in response. The major and minor influences that geometric parameter modifications have on device performance are distinguished as primary and secondary influences, respectively, in Table 5. The various aspects of device performance are preferably considered when manipulating each geometric dimension are listed below.

TABLE 5

| Parameter | Definition | Primary Influence | Secondary Influence |
| --- | --- | --- | --- |
| B | Buffer layer thickness (in this case $SiO_2$) | RF optical overlap Value of C | RF dielectric losses |
| $E_L$ | width of the 'hot' electrode | Value of $C_o$ RF propagation loss | Frequency dependence of the RF loss |
| G | Electrode gap | RF/optical overlap Value of $C_o$ | |
| H | Depth of the excavated groove between the modulator waveguides | Modulator extinction ratio Value of C | RF/optical overlap |
| T | Electrode thickness | RF propagation losses Value of $C_o$ | |
| w | width of the waveguide ridge | Value of C Optical scattering loss | RF dielectric loss |

The determination of a process to manufacture laterally confined LiNbO$_3$ electro-optic modulators satisfies the most difficult constraint associated with the realization of this structure design, namely the total thickness variation (TTV) in the width of the ferroelectric material in the modulator. The width of the ferroelectric material is preferably such that it can be aligned to within tens of microns to in the modulator. In the following discussion, the fabrication of a laterally confined modulator with a symmetric dual drive (SDD) electrode configuration is addressed. The advantage of the SDD laterally confined modulator is that the total width of the LiNbO$_3$ can be made arbitrarily large, however, the ferroelectric material is preferably thinned to within the design tolerances of the structure.

Figure 31:
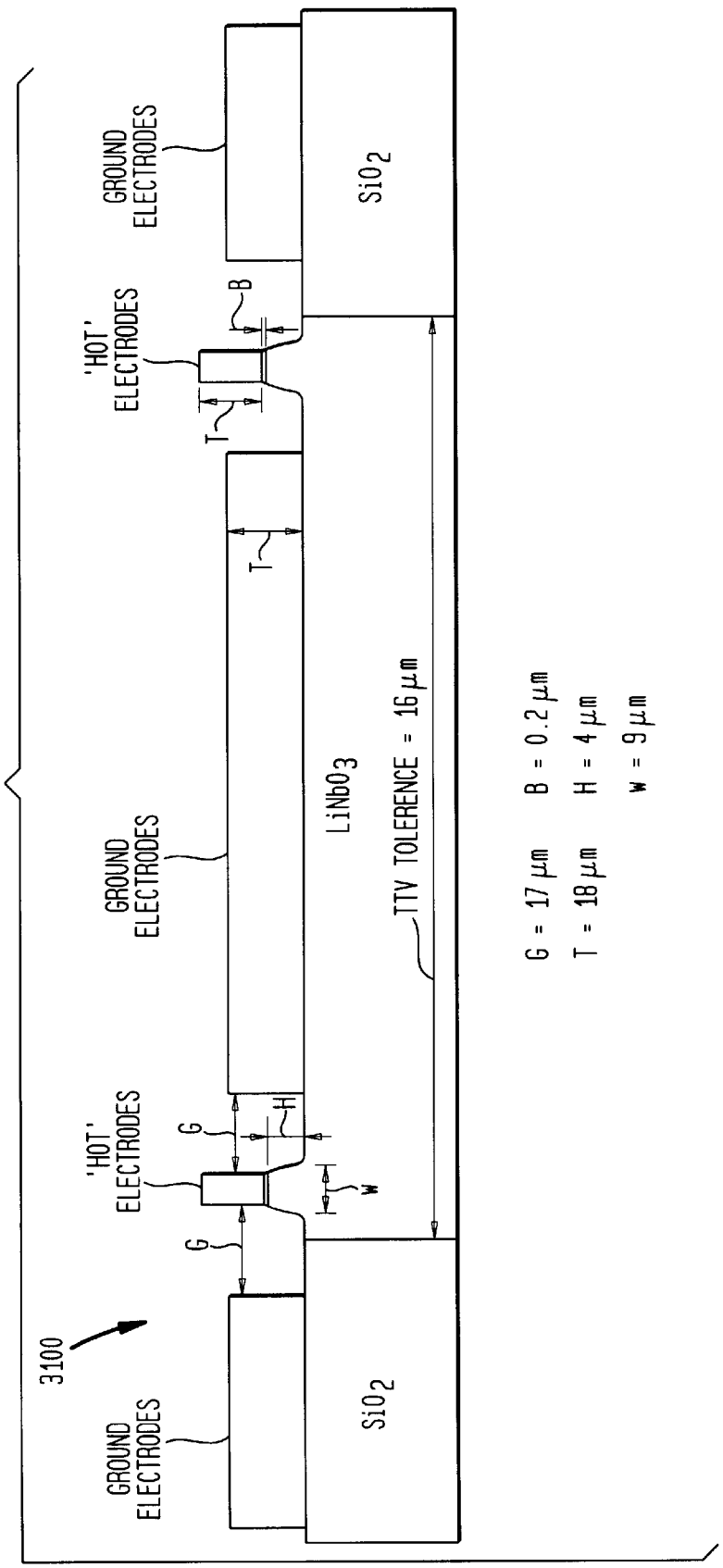
FIG. 31 illustrates one example set of design parameters for an EO modulator according to the present invention.

The design tolerance of the LiNbO$_3$ width TTV in a z-cut modulator, for example, is dependent on the electrode design. In general, the larger the electrode gap, the larger the TTV tolerance of the LiNbO$_3$ in the modulator. The maximum LiNbO$_3$ width tolerance may be defined, for example, as the width at which the device drive voltage is increased by approximately 5 % from that of a velocity-matched design (assuming the structure has the same LiNbO$_3$ width along its entire interaction length). It is noted that the acceptable width variation depends on the length of the modulator interaction region. Therefore, TTV tolerances for various designs assuming three interaction lengths (a 2 cm, 3 cm, and 4 cm waveguide interaction length) are identified. As an initial example, FIG. 31 shows a modulator design 3100 with an electrode gap of 17 μm. The fabrication tolerance of this structure is a TTV of 32 μm for a 2 cm device, 24 μm for a 3 cm device, and 16 μm for a 4 cm device.

Figure 32:
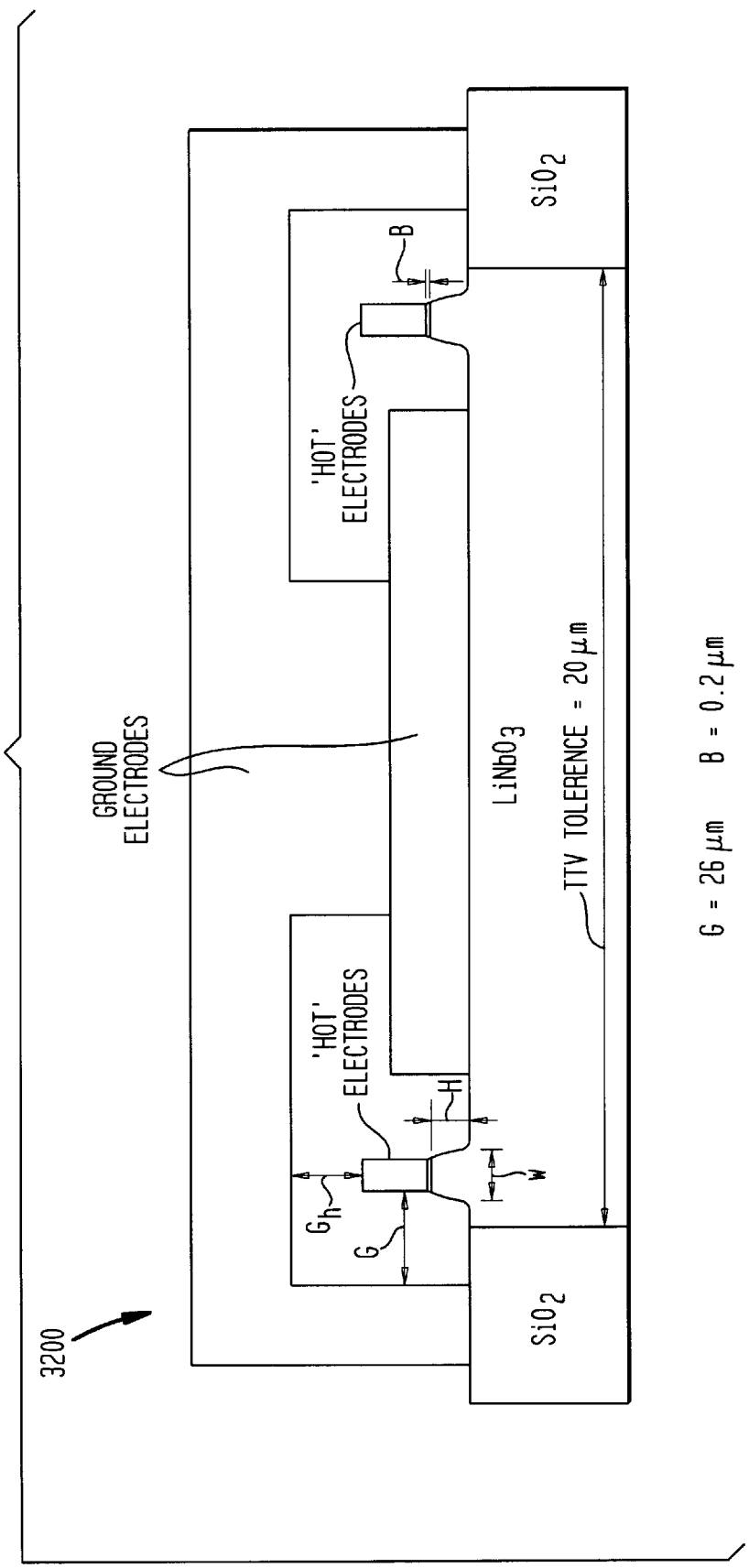
FIG. 32 illustrates one example set of design parameters for an EO modulator according to the present invention.
Figure 33:
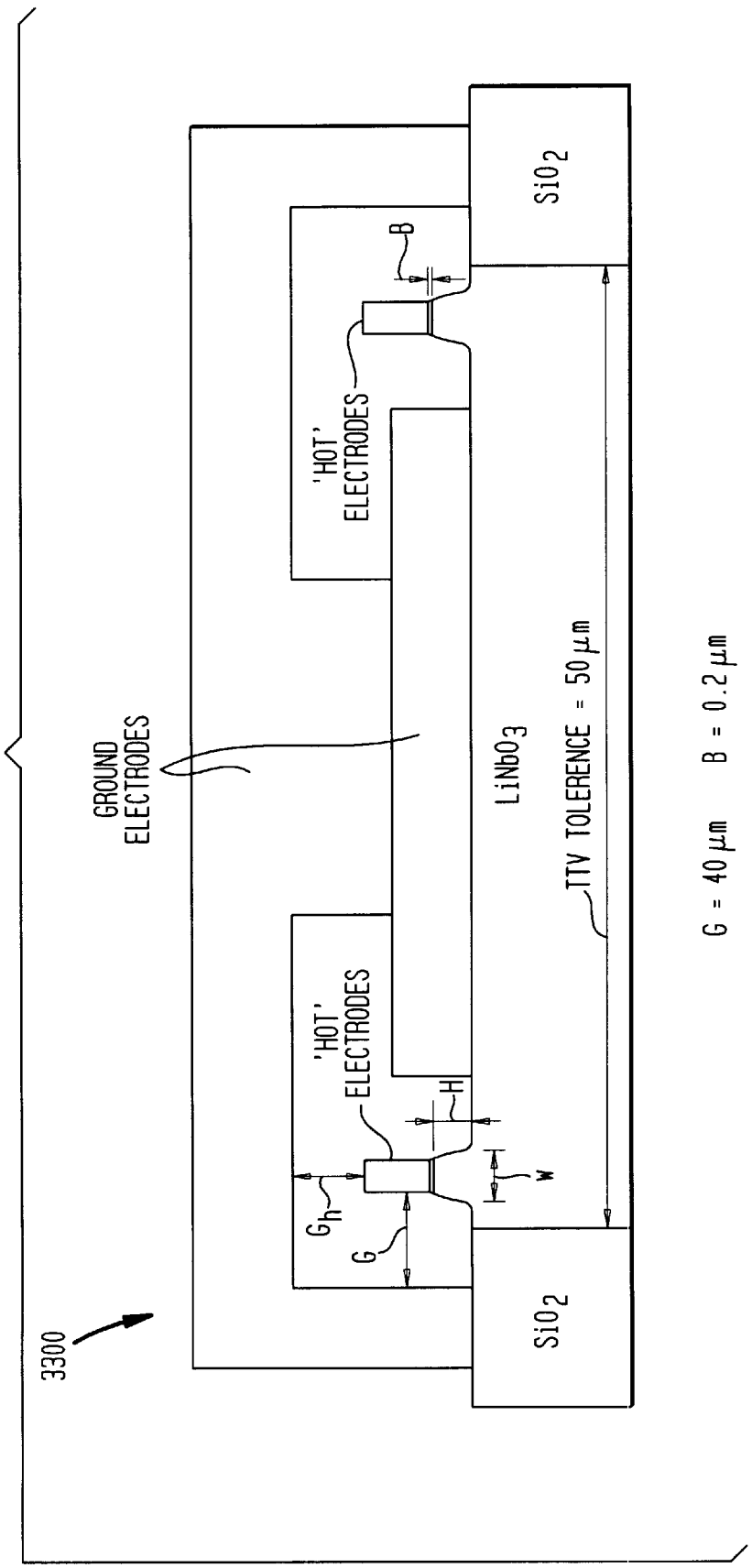
FIG. 33 illustrates one example set of design parameters for an EO modulator according to the present invention.

If the design of the modulator 3100 is modified, as shown in FIG. 32, so that the electrode gap can be made to be larger, the TTV tolerance of the ferroelectric film width is increased. The electrode gap of the structure 3200 shown in FIG. 32 is 26 μm. The fabrication tolerance of this structure is a TTV of 48 μm for a 2 cm device, 28 μm for a 3 cm device, and 20 μm for a 4 cm device. If the structure 3200 is further modified such that the electrode gap is 40 μm (structure 3300, FIG. 33) the LiNbO$_3$ TTV tolerance becomes even more relaxed. The fabrication tolerance of this structure is a TTV of 70 μm for a 2 cm device, 60 μm for a 3 cm device, and 50 μm for a 4 cm device. These results are summarized in Table 6.

TABLE 6

| | TTV for 2 cm interaction length (μm) | TTV for 3 cm interaction length (μm) | TTV for 4 cm interaction length (μm) |
| --- | --- | --- | --- |
| 17 μm electrode gap | 32 | 24 | 16 |
| 26 μm electrode gap | 48 | 28 | 20 |
| 40 μm electrode gap | 70 | 60 | 50 |

The stated total thickness variation for commercially available LiNbO$_3$ wafers is TTV <10 μm with a <20 μm wafer-to-wafer thickness variation. Therefore, the above mentioned fabrication tolerances are well within the present day industrial standards for commercially available LiNbO$_3$ wafers.

It is noted that the improvement in device behavior in a laterally confined modulator design is related to a variation in the effective dielectric constant of the substrate within the cross section of the device. The effective dielectric constant is made lower away from the electrode gap region and higher near the electrode gap region. This allows the EO overlap to remain large while the overall device line capacitance is reduced. For example, to gain benefit from laterally confining the ferroelectric, the ferroelectric is preferably made smaller in width than the device electrodes. The following discussion with reference to FIGS. 34–37 will illustrate this point.

FIG. 34 illustrates a modulator 3400 including a ferroelectric material 3402 confined by SiO$_2$ 3404, 3406. The material 3402 supports first and second optical waveguides 3408, 3410 as well as ground electrodes 3412, 3414, and a signal electrode 3416. FIG. 35 illustrates a modulator 3500 including a ferroelectric material 3502 confined by $SiO_2$ 3504, 3506. The material 3502 supports first and second optical waveguides 3508, 3510 as well as ground electrodes 3512, 3514, and a signal electrode 3516. Similarly, FIG. 36 illustrates a modulator 3600 including a ferroelectric material 3602 confined by $SiO_2$ 3604, 3606. The material 3602 supports first and second optical waveguides 3608, 3610 as well as ground electrodes 3612, 3616, and a signal electrode 3614. FIG. 37 presents a modulator 3700 including a ferroelectric material 3702 confined on one side by $SiO_2$ 3704. The material 3702 supports first and second optical waveguides 3706, 3708 as well as ground electrode 3710 and a signal electrode 3712.

If the ferroelectric material is laterally confined, as shown in FIG. 34, such that the width of the ferroelectric material 3402 is substantially equal to the size of the device electrodes 3412, 3414, there will effectively be no change in the line capacitance of the device. In this case, no benefit will be gained from the lateral confinement of the ferroelectric. If the lateral confinement is such that the ferroelectric is made smaller than the device electrodes but still greater than or equal to the electrode gap (see FIG. 35), there will be a reduction in device capacitance while maintaining EO overlap, and device performance is generally enhanced. One important aspect of the advantage gained by using this technique is that the reduction in device capacitance can be achieved without a large reduction in the device EO overlap.

If the ferroelectric material is made very thin (see FIG. 36), then there will be a further reduction in device capacitance, but there will also be a significant reduction in the device EO overlap. In this case there will be an overall reduction in device performance. The description of the lateral confinement of the ferroelectric material as not extending substantially beyond the waveguides includes the situation, particularly in an x-cut device, in which the ferroelectric material extends near the edges of the ground electrodes (e.g., the edges 3518, 3520 of the ground electrodes 3512, 3514 shown in FIG. 35). The ferroelectric material may thereby overlap the ground electrodes by several microns. Note that there is an optimum amount of lateral confinement, with regard to device performance, beyond which device performance degrades. In addition, a benefit can be gained by any reduction in the substrate dielectric constant under the device electrodes but away from the electrode gaps. Therefore, in certain device designs, significant benefit may be derived from the lateral confinement of the ferroelectric on only one side.

FIG. 37 illustrates one example of single sided confinement (i.e., the ferroelectric material 3702 does not extend beyond the area defined by (i.e., underneath) the furthest extent 3714 of the electrode 3710, but does extend beyond the area defined by the furthest extent 3716 of the electrode 3712). Note that for the design shown in FIG. 37, the fabrication tolerances associated with the lateral confinement of the ferroelectric are related to the size of the electrode under which the effective dielectric constant is reduced. Accordingly, in the case of the design shown in FIG. 37, the ferroelectric material 3702 is confined under the larger ground plane electrode 3710 rather than the smaller 'hot' electrode 3712. In this way, the device line capacitance is much less sensitive to variations in the distance between the electrode gap and the border between the $LiNbO_3$ and SiO2, and fabrication tolerances are relaxed.

Many modifications and variations of the present invention are possible in light of the above teachings. Thus, it is to be understood that, within the scope of the appended claims, the invention may be practiced otherwise than as described hereinabove.

What is claimed is:

1. An electro-optic modulator comprising:
   a first electrode;
   a second electrode offset from the first electrode;
   a substrate for supporting the electrodes with an electro-optic material laterally confined on at least one side;
   a first optical waveguide supported in the electro-optic material; and
   a second optical waveguide supported in the electro-optic material and spaced apart from the first optical waveguide, the electro-optic material confined laterally to a width that includes the first and second optical waveguides and that is smaller than a width defined by a furthest extent of an electrode.

2. An electro-optic modulator as recited in claim 1 wherein the electro-optic material is confined laterally to a width that includes the first and second optical waveguides and is smaller than a width defined by a furthest extent of the electrodes.

3. An electro-optic modulator as recited in claim 1 including a thin buffer layer disposed between the substrate and the first and second electrodes.

4. An electro-optic modulator as recited in claim 1 wherein said substrate is a composite substrate that includes the electro-optic material and a second material for laterally confining the electro-optic material.

5. An electro-optic modulator as recited in claim 4 wherein said second material has a low dielectric constant.

6. An electro-optic modulator as recited in claim 4 wherein said second material has a low Radio Frequency dielectric loss.

7. An electro-optic modulator as recited in claim 1 wherein the electro-optic material is laterally confined by air.

8. An electro-optic modulator as recited in claim 1 wherein the first electrode is located substantially above the first optical waveguide.

9. An electro-optic modulator as recited in claim 8 wherein the electro-optic material is $LiNbO_3$ having a z-cut orientation.

10. An electro-optic modulator as recited in claim 8 wherein the electro-optic material is $LiTaO_3$ having a z-cut orientation.

11. An electro-optic modulator as recited in claim 8 wherein the second electrode is located substantially above the second optical waveguide.

12. An electro-optic modulator as recited in claim 1 wherein the electro-optic material has an x-cut orientation and wherein the first and second electrodes are offset from the first and second optical waveguides.

13. An electro-optic modulator as recited in claim 12 further comprising a third electrode located between the first and second optical waveguides.

14. An electro-optic modulator as recited in claim 13 further comprising fourth and fifth electrodes offset from the first, second, and third electrodes.

15. An electro-optic modulator as recited in claim 12 further comprising a buffer layer disposed between the first electrode and the first waveguide, and a buffer layer disposed between the second electrode and the second waveguide.

16. An electro-optic modulator as recited in claim 8 further comprising a first buffer layer disposed between the first electrode and the first waveguide, and a second buffer layer disposed between the second electrode and the second waveguide.

17. An electro-optic modulator as recited in claim 16 further comprising a third electrode supported by the electro-optic material and offset from the first and second electrodes.

18. An electro-optic modulator as recited in claim 17 wherein the third electrode is disposed between the first and second electrodes and further comprising fourth and fifth electrodes offset from the first, second, and third electrodes.

19. An electro-optic modulator as recited in claim 1 further including an input waveguide; an output waveguide; a first waveguide coupling region coupled to the input waveguide and the first and second optical waveguides; and a second waveguide coupling region coupled to the first and second optical waveguides and the output waveguide.

20. An electro-optic modulator comprising:
a first electrode;
a second electrode offset from the first electrode;
a substrate for supporting the first and second electrodes;
a first optical waveguide;
a second optical waveguide; and
a thin electro-optic film supported by the substrate, the thin electro-optic film having a first thickness for supporting the first and second optical waveguides, and having a reduced thickness under a portion of the electrodes.

21. An electro-optic modulator as recited in claim 20 wherein the reduced thickness of the thin electro-optic film is zero.

22. An electro-optic modulator as recited in claim 20 wherein the first electrode is located substantially above the first optical waveguide.

23. An electro-optic modulator as recited in claim 22 wherein the electro-optic film is $LiNbO_3$ having a z-cut orientation.

24. An electro-optic modulator as recited in claim 22 wherein the electro-optic film is $LiTaO_3$ having a z-cut orientation.

25. An electro-optic modulator as recited in claim 22 wherein the second electrode is located substantially above the second optical waveguide.

26. An electro-optic modulator as recited in claim 22 further comprising a first buffer layer disposed between the first electrode and the first waveguide, and a second buffer layer disposed between the second electrode and the second waveguide.

27. An electro-optic modulator as recited in claim 26 further comprising a third electrode supported by the substrate and offset from the first and second electrodes.

28. An electro-optic modulator as recited in claim 27 wherein the third electrode is disposed between the first and second electrodes and further comprising fourth and fifth electrodes offset from the first, second, and third electrodes.

29. An electro-optic modulator as recited in claim 20 wherein the electro-optic film has an x-cut orientation and wherein the first and second electrodes are offset from the first and second optical waveguides.

30. An electro-optic modulator as recited in claim 29 further comprising a third electrode located between the first and second optical waveguides.

31. An electro-optic modulator as recited in claim 30 further comprising fourth and fifth electrodes offset from the first, second, and third electrodes.

32. An electro-optic modulator as recited in claim 29 further comprising a buffer layer disposed between the first electrode and the first waveguide, and a buffer layer disposed between the second electrode and the second waveguide.

33. An electro-optic modulator as recited in claim 20 further including an input waveguide; an output waveguide; a first waveguide coupling region coupled to the input waveguide and the first and second optical waveguides; and a second waveguide coupling region coupled to the first and second optical waveguides and the output waveguide.

34. An electro-optic modulator comprising:
a first electrode;
a second electrode offset from the first electrode;
a substrate for supporting the first and second electrodes;
a first optical waveguide;
a second optical waveguide; and
a thin electro-optic film supported by the substrate, the thin electro-optic film having a first thickness for supporting the first and second optical waveguides, and having a reduced thickness in at least one electrode gap.

35. An electro-optic modulator as recited in claim 34 wherein the first electrode is located substantially above the first optical waveguide.

36. An electro-optic modulator as recited in claim 35 wherein the electro-optic film is $LiNbO_3$ having a z-cut orientation.

37. An electro-optic modulator as recited in claim 35 wherein the electro-optic film is $LiTaO_3$ having a z-cut orientation.

38. An electro-optic modulator as recited in claim 35 wherein the second electrode is located substantially above the second optical waveguide.

39. An electro-optic modulator as recited in claim 35 further comprising a buffer layer disposed between the first electrode and the first waveguide, and a buffer layer disposed between the second electrode and the second waveguide.

40. An electro-optic modulator as recited in claim 39 further comprising a third electrode supported by the substrate and offset from the first and second electrodes.

41. An electro-optic modulator as recited in claim 40 wherein the third electrode is disposed between the first and second electrodes and further comprising fourth and fifth electrodes offset from the first, second, and third electrodes.

42. An electro-optic modulator as recited in claim 34 wherein the electro-optic film has an x-cut orientation and wherein the first and second electrodes are offset from the first and second optical waveguides.

43. An electro-optic modulator as recited in claim 42 further comprising a third electrode located between the first and second optical waveguides.

44. An electro-optic modulator as recited in claim 43 further comprising fourth and fifth electrodes offset from the first, second, and third electrodes.

45. An electro-optic modulator as recited in claim 42 further comprising a buffer layer disposed between the first electrode and the first waveguide, and a buffer layer disposed between the second electrode and the second waveguide.

46. An electro-optic modulator as recited in claim 34 further including an input waveguide; an output waveguide; a first waveguide coupling region coupled to the input waveguide and the first and second optical waveguides; and a second waveguide coupling region coupled to the first and second optical waveguides and the output waveguide.

47. An electro-optic modulator as recited in claim 34 wherein the reduced thickness of the thin electro-optic film is zero.

* * * * *